United States Patent [19]

Nishikawa

[11] Patent Number: 4,959,740
[45] Date of Patent: Sep. 25, 1990

[54] DISC RECORDING AND/OR REPRODUCING APPARATUS INCLUDING MEANS FOR MINIMIZING THE EFFECTS OF TEMPERATURE CHANGES

[75] Inventor: Tatsuo Nishikawa, Tachikawa, Japan

[73] Assignee: Canon Denshi Kabushiki Kaisha, Chichibu, Japan

[21] Appl. No.: 409,985

[22] Filed: Sep. 19, 1989

Related U.S. Application Data

[63] Continuation of Ser. No. 328,734, Feb. 8, 1989, abandoned, which is a continuation of Ser. No. 207,011, Jun. 5, 1988, abandoned, which is a continuation of Ser. No. 673,156, Nov. 19, 1984, abandoned.

[30] Foreign Application Priority Data

| Nov. 18, 1983 | [JP] | Japan | 58-215961 |
| Nov. 18, 1983 | [JP] | Japan | 58-215967 |
| Nov. 18, 1983 | [JP] | Japan | 58-215968 |
| Nov. 18, 1983 | [JP] | Japan | 58-215973 |
| Nov. 18, 1983 | [JP] | Japan | 58-215974 |

[51] Int. Cl.$^5$ .................. G11B 5/52; G11B 21/04; G11B 5/012; G11B 17/00
[52] U.S. Cl. .................. 360/106; 360/107; 360/97.01; 360/86; 360/99.04
[58] Field of Search .......... 360/74.5, 75, 77, 78, 360/86, 97.01, 99.04, 99.11, 104–107, 109, 137; 369/44, 46

[56] References Cited

U.S. PATENT DOCUMENTS

| 3,720,930 | 3/1973 | Elsing | 360/106 |
| 4,164,769 | 8/1979 | Kaseta et al. | 360/97 |
| 4,223,359 | 9/1980 | Galvagni | 360/86 |
| 4,318,144 | 3/1982 | Galvagni | 360/99 X |
| 4,396,959 | 8/1983 | Harrison et al. | 360/78 |
| 4,516,177 | 5/1985 | Moon et al. | 360/77 X |
| 4,665,456 | 5/1987 | Mikamoto et al. | 360/96.6 X |
| 4,802,040 | 1/1989 | Komatsu et al. | 360/106 |

FOREIGN PATENT DOCUMENTS

| 0055568 | 7/1982 | European Pat. Off. | 369/44 |
| 0129973 | 1/1985 | European Pat. Off. | 360/106 |
| 56-159867 | 12/1981 | Japan | 360/106 |
| 57-127969 | 8/1982 | Japan | 360/106 |
| 58-77065 | 5/1983 | Japan | 360/105 |
| 59-82666 | 5/1984 | Japan | 360/105 |
| 1276969 | 6/1972 | United Kingdom | 360/104 |

Primary Examiner—Robert S. Tupper
Assistant Examiner—Alfonso Garcia
Attorney, Agent, or Firm—Spencer & Frank

[57] ABSTRACT

A recording and/or reproducing apparatus for recording on and/or reproducing from a recording medium. The apparatus includes a head supported by a head mount movable in the radial direction of the recording medium and a head positioning member for displacing the head mount to position the head with respect to the recording medium. The head positioning member includes a shaft for rotating the recording medium about its axis of rotation and a cam which is rotatable about the shaft, the axis of rotation of the cam and recording medium being coincident and the rotation of the shaft being independent of the rotation of the cam. The cam is made of a material having a coefficient of thermal expansion substantially equal to that of the material of the recording medium.

18 Claims, 28 Drawing Sheets

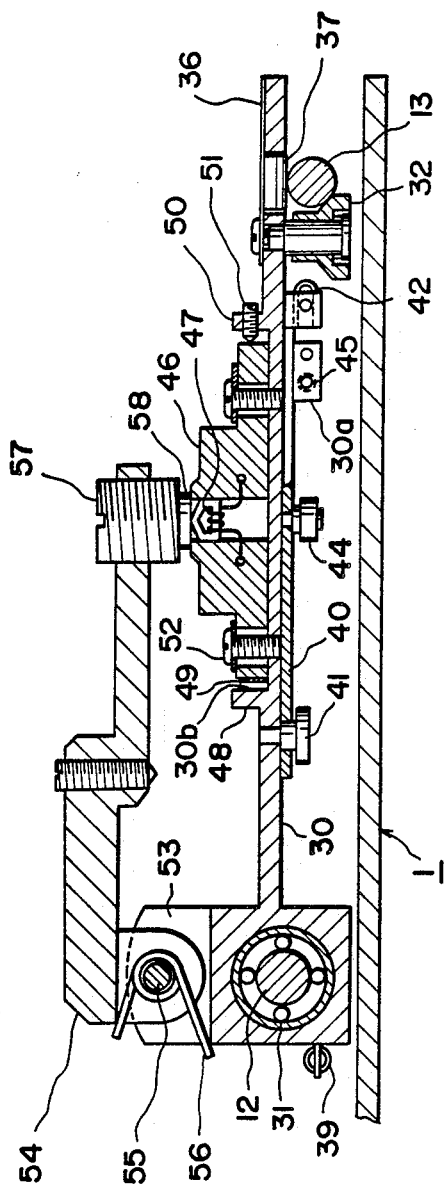
FIG_4

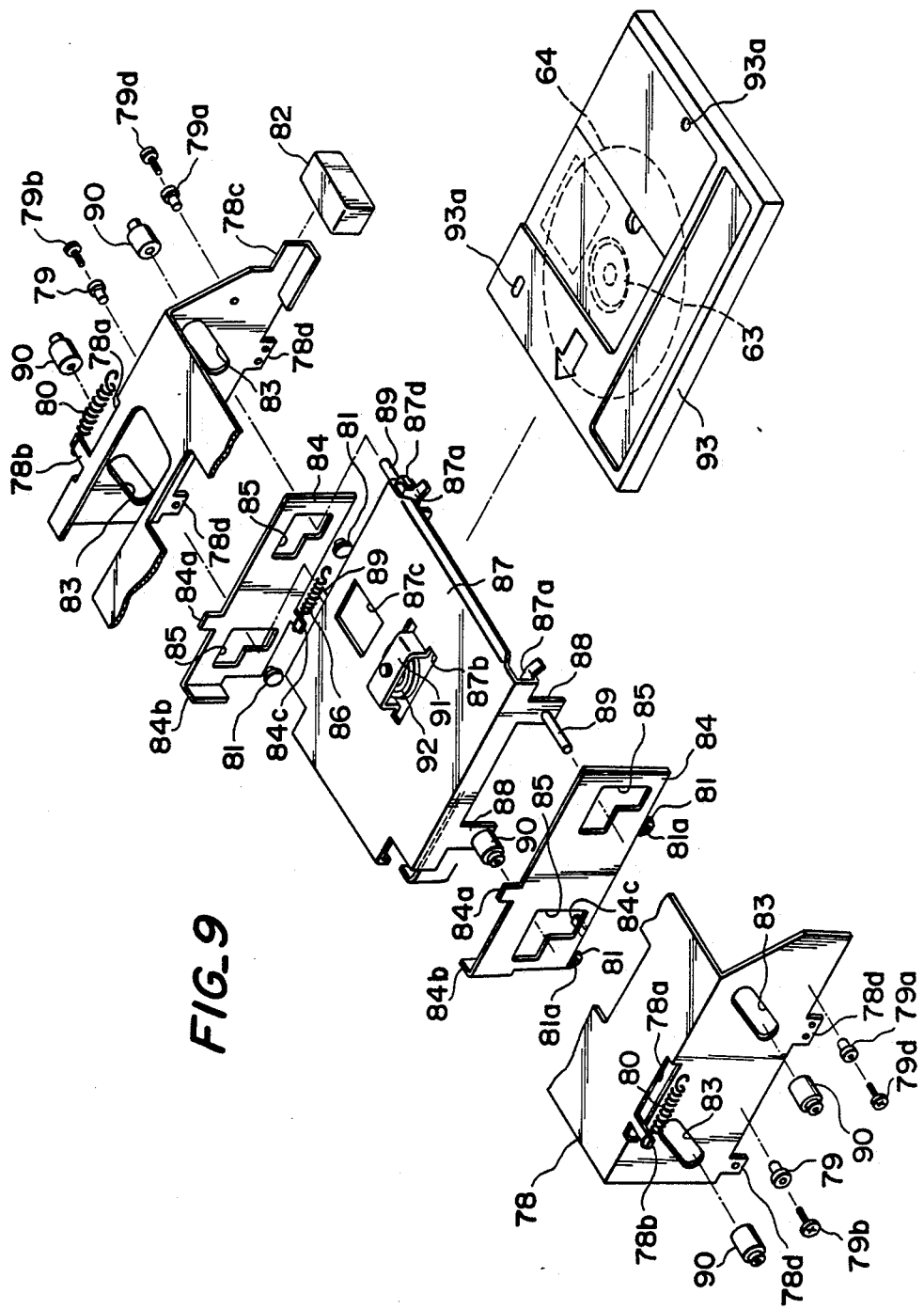

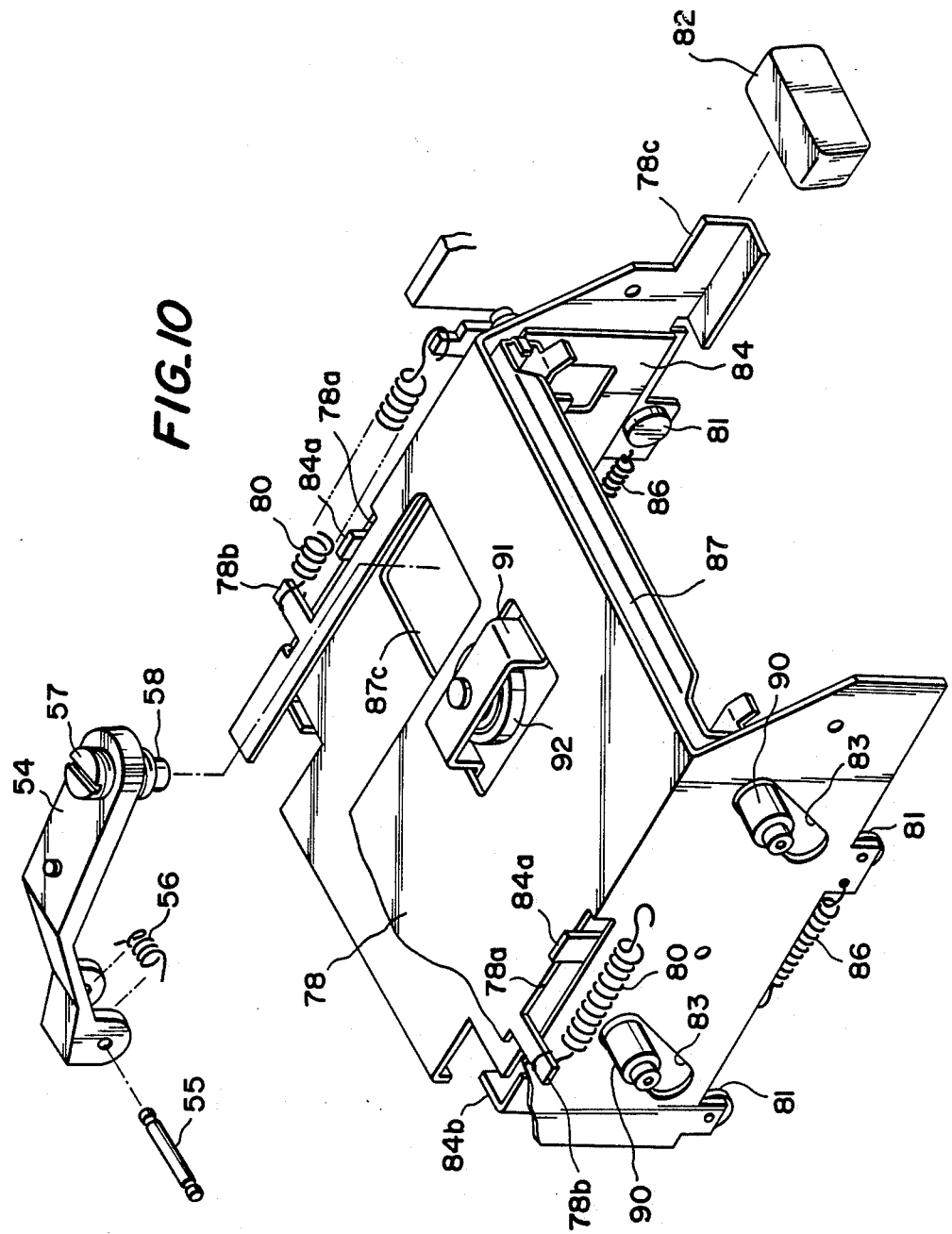

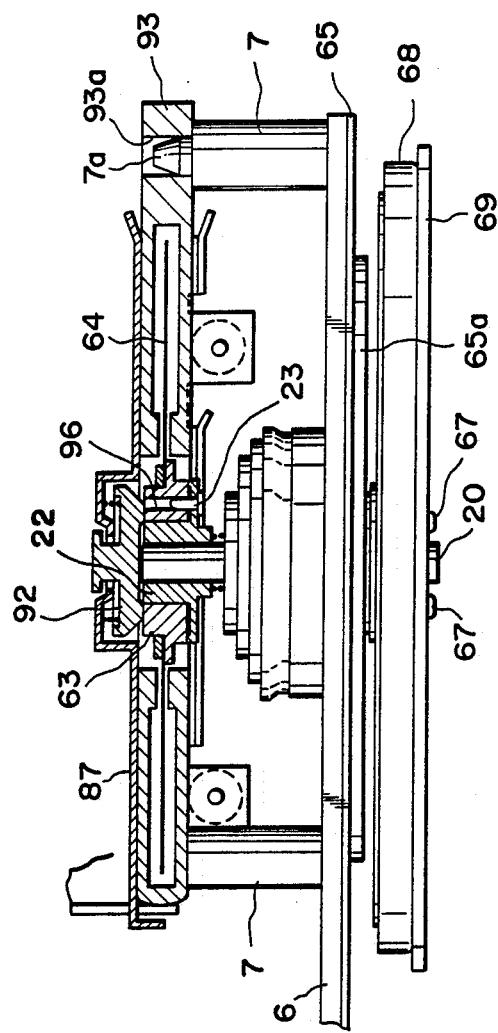

FIG_13A
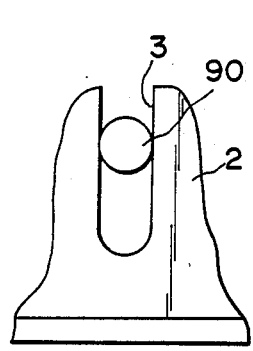
FIG_13B
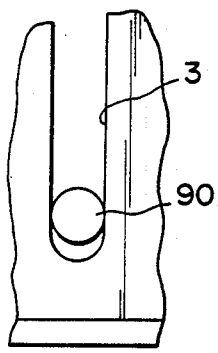
FIG_13C
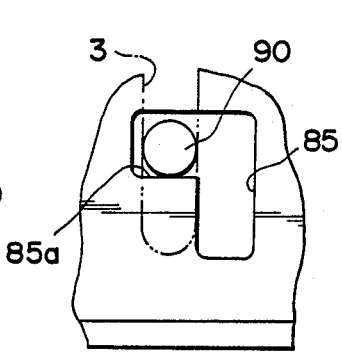
FIG_13D
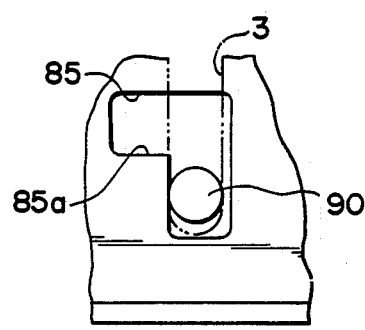
FIG_13E
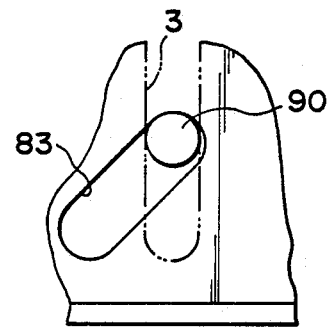
FIG_13F
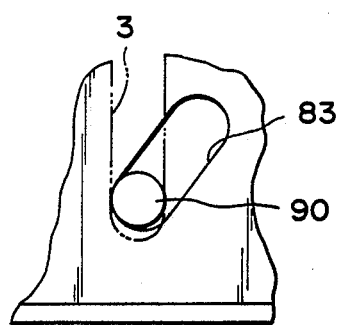
FIG_13G
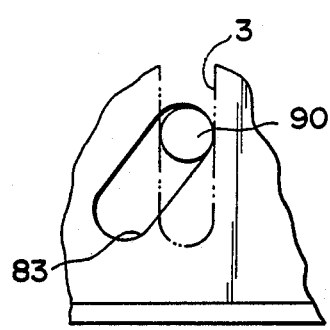

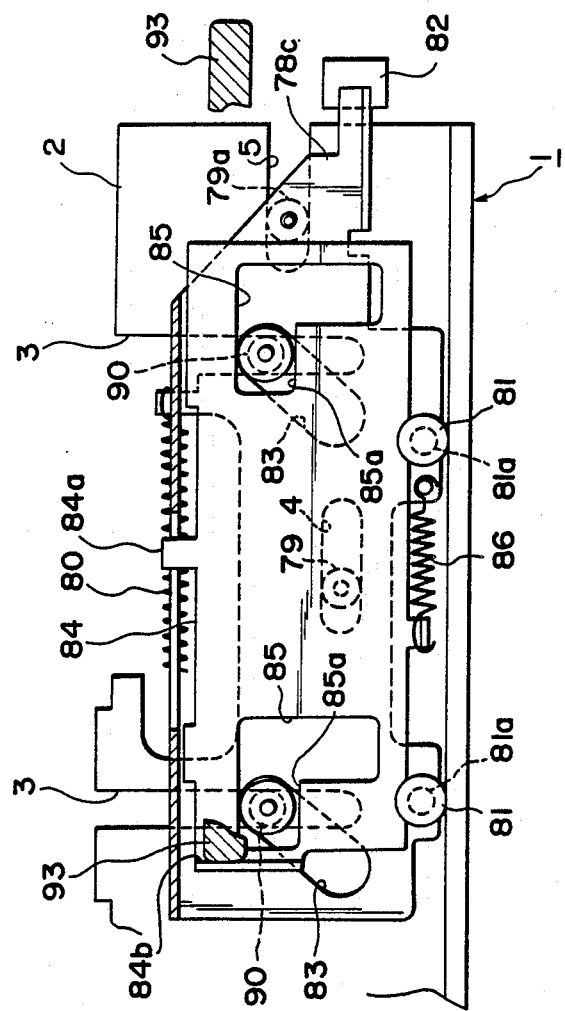

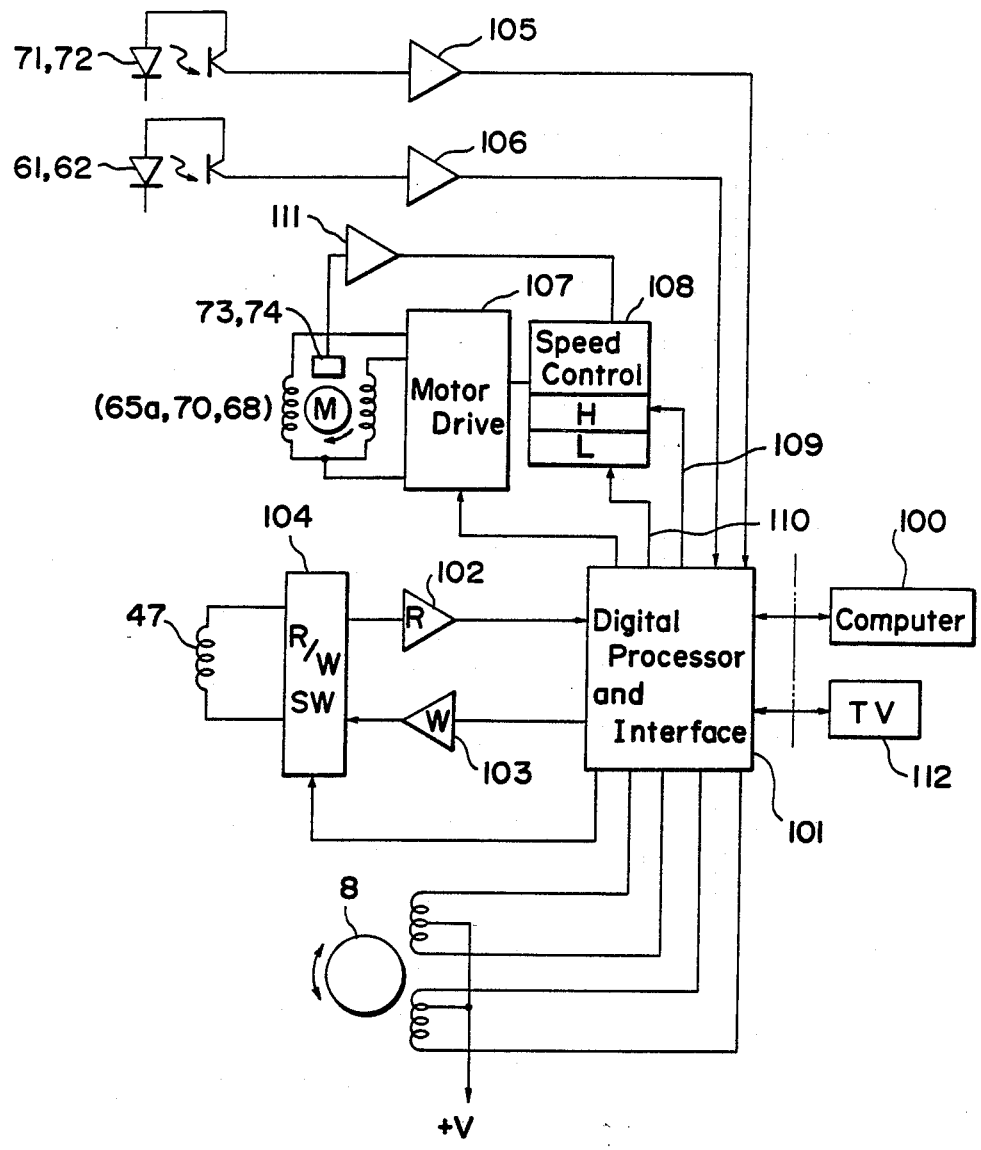
FIG_20A

FIG_22B
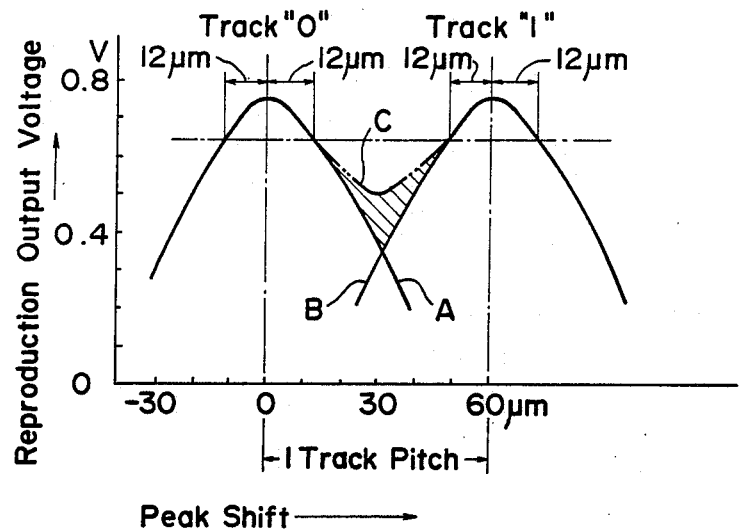
FIG_22C
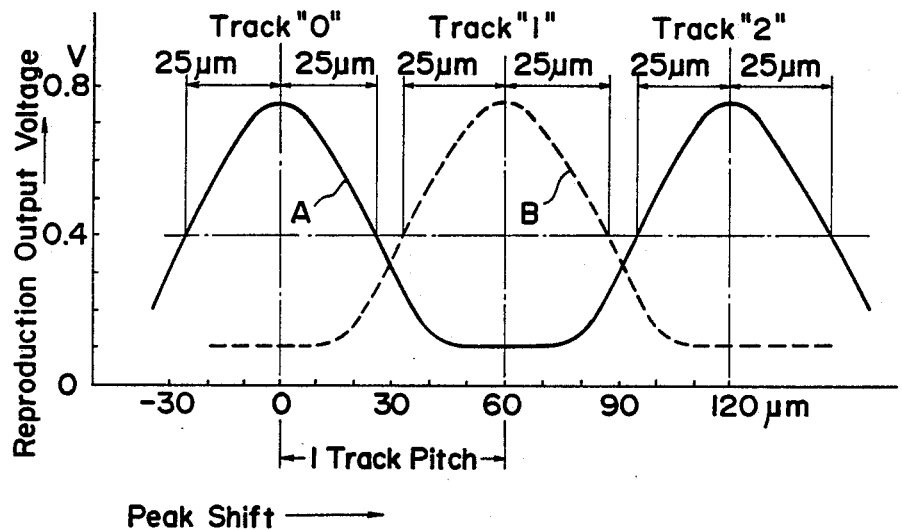

FIG._23A
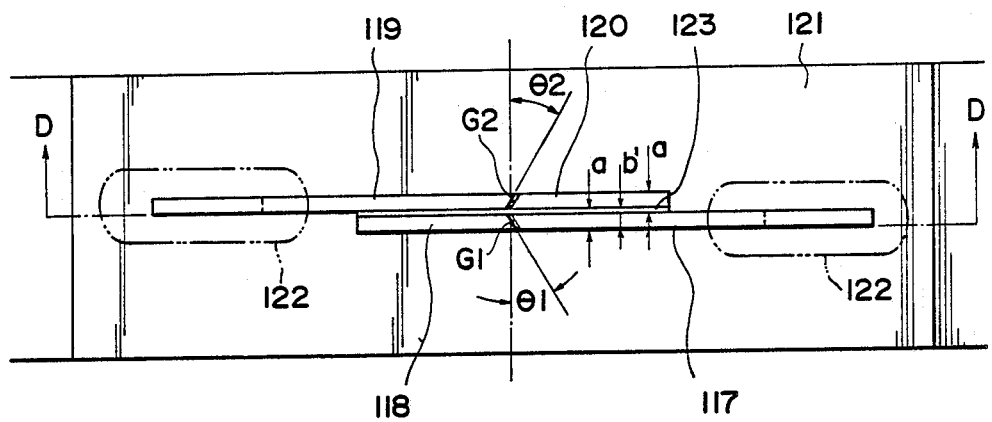
FIG._23B
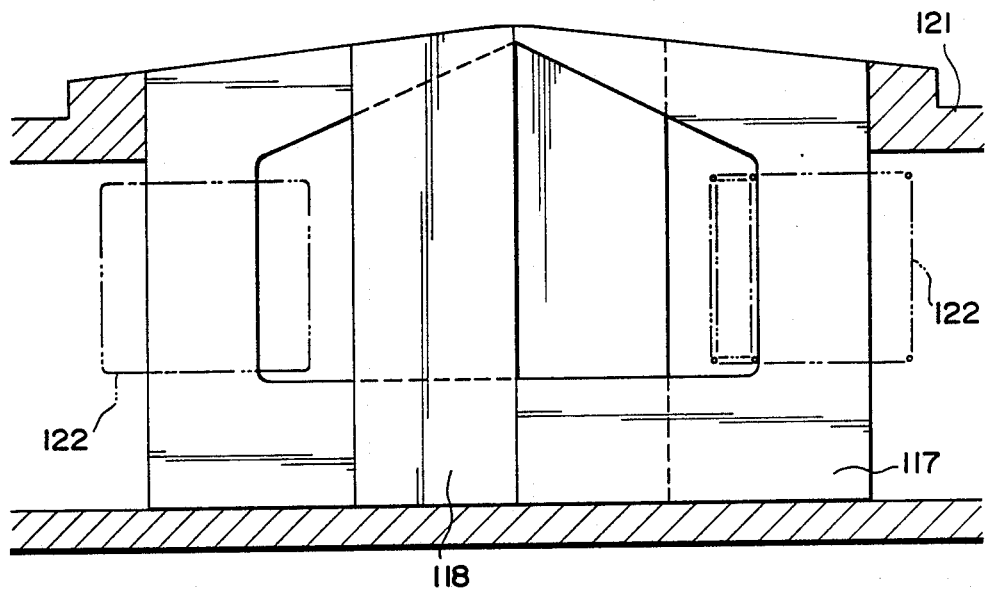

DISC RECORDING AND/OR REPRODUCING APPARATUS INCLUDING MEANS FOR MINIMIZING THE EFFECTS OF TEMPERATURE CHANGES

This application is a continuation of Application Ser. No. 07/1328,734, filed Feb. 8, 1989, which is a Continuation Application Ser. No. 07/1207,011 filed June 15, 1988 which is a Continuation Application of Ser. No. 06/1673,156 filed Nov. 19, 1984, all three now abandoned.

BACKGROUND OF THE INVENTION

1. FIELD OF THE INVENTION

The present invention relates to a disc recording and/or reproducing apparatus and more particularly to a disc recording and/or reproducing apparatus in which a recording and/or reproducing head is moved radially with respect to a disc-like recording medium to record or reproduce information into or from the recording medium.

2. DESCRIPTION OF THE PRIOR ART

For example, a magnetic disc recording and/or reproducing apparatus is such an apparatus that has a magnetic head to be moved radially relative to a magnetic disc which is rotated so that information is magnetically recorded or reproduced along a track defined on the magnetic disc.

In such an apparatus of the type described above, the accuracy of the displacement of a magnetic head; that is, the accuracy of positioning a magnetic head at a desired position on the disc is dependent upon the accuracy of a pulse motor as a driver for shifting the magnetic head and the machining tolerances of various parts of the apparatus. In this regard, the accuracies of such pulse motor and various parts are strictly controlled.

Even if high precision parts are used, there arises a problem of accuracy of assembling these parts. If assembly tolerances vary, it is of no use to use high precision parts. In addition, a high assembling accuracy leads to an increase of manufacturing cost.

As a mechanism for displacing a magnetic head with respect to a magnetic disc, there is known a mechanism in which a head mount having a magnetic head mounted thereon is displaced through a cam by a pulse motor. However, unless the guide mechanism of the head mount is compact in size and light in weight, a large force is exerted on the cams and the pulse motor. As a result, the output of the pulse motor must be increased and the mechanical strength of the cam mechanism must be strengthened. This means that the pulse motor and the cam mechanism become complicated in construction, large in size and heavy in weight, resulting in a high manufacturing cost.

In addition, the magnetic head must be accurately positioned at a desired track. Especially, the same magnetic disc is used by various magnetic disc recording and/or reproducing apparatuses and compatibility among magnetic discs is required. Therefore, the magnetic head must be accurately mounted on the head mount.

From this viewpoint, it is desired that the tolerance of the head mount with which the magnetic head is mounted on the head mount as well as the deviation of the position of a head chip relative to the head mount must be correctly adjusted.

Furthermore, there is a positioning mechanism of the magnetic head in which a cam is arranged around a rotating axis of the magnetic disc so that the cam serves to position the magnetic head at a desired track on the magnetic disc. In general, the base of the magnetic disc is made of synthetic resin, while the cam is usually made of a metal material. Accordingly, the expansion coefficients of both materials are different from each other.

When the coefficient of linear expansion of the magnetic disc is different from that of the cam for displacing the magnetic head, the position of the magnetic head is deviated from a desired track depending upon temperature. As a result, the reproduction output from the magnetic head is lowered.

If the reproduction output is lowered, it follows that correct information is not reproduced and there is the possibility that erroneous information is likely to be reproduced so that the reliability of the apparatus is decreased.

Furthermore, it is usual that the pitch of a track to be formed on a magnetic disc is small, and accordingly it is necessary that the track position and especially the outermost track position are detected correctly. Therefore, a highly accurate detection means is required in order to detect the track position. This means that the apparatus becomes very expensive.

SUMMARY OF THE INVENTION

The present invention was made to overcome the above and other problems encountered in the conventional disc recording and/or reproducing apparatus and has for its object to provide a disc recording and/or reproducing apparatus which is extremely simple in construction and yet capable of positioning a magnetic head at a desired position with a higher degree of accuracy without being adversely affected by assembly tolerances.

In order to achieve the above object, in a first aspect of the present invention, a disc recording and/or reproducing apparatus comprises:

a recording and/or reproducing head for recording and/or reproducing information on and/or from a disc-shaped recording medium;

a rotary shaft for rotating the disc-shaped recording medium;

a hollow member which surrounds the rotary shaft without preventing the rotation thereof;

a head positioning member having a cam which is rotatable around the outer periphery of the hollow member, whose position relative to the center of rotation varies, and which positions the recording and/or reproducing head on the disc-shaped recording medium;

a head mount having an engaging portion for engaging with the cam surface and a mounting portion on which the recording and/or reproducing head is mounted, and for displacing the recording and/or reproducing head with respect to the disc-shaped recording medium in response to the rotation of the cam; and a biasing member for forcing the head mount against the hollow member so that the outer periphery of the hollow member is made into contact with the inner periphery of the head positioning member at a position in the direction in which the head mount is forced to move.

Here, the hollow member may be a boss having bearings for rotatably supporting the rotary shaft and the boss can be securely fixed to a chassis. The inner periphery of the head positioning member may have an inner diameter larger than the outer diameter of the outer periphery of the hollow member. The rotation of the head positioning member may be transmitted from a drive means via a gear member. The center of the rotation cannot be fixed by the force of the biasing member. The cam in the head positioning member can be provided with a plurality of cam surfaces which are formed discontinuously, so that the position of the recording and/or reproducing head is varied stepwise in response to the rotation.

It is a second object of the present invention to provide a disc recording and/or reproducing apparatus provided with a mechanism for displacing a head which is compact in size and light in weight so that the head can be correctly displaced from one position to another.

In order to achieve the above object, in a second aspect of the present invention, a disc recording and/or reproducing apparatus comprises:

a recording and/or reproducing head for recording and/or reproducing information on and/or from a disc-shaped recording medium;

a head mount on which the recording and/or reproducing head is mounted;

a first guide member extending in the radial direction of the disc-shaped recording medium;

a head positioning member for displacing the head mount along the first guide member to position the recording and/or reproducing head on the disc-shaped recording medium; and a bearing member disposed on the head mount for reducing a sliding friction to be produced when the head mount is displaced along the first guide member.

Here, the head mount may be provided with a second guide member disposed in parallel with the first guide member and a roller member for making rolling contact with the second guide member. The bearing member may comprise a roller bearing, or a sliding bearing made of a wear resistant material such as ruby.

It is a third object of the present invention to provide a disc recording and/or reproducing apparatus provided with a position adjustment mechanism capable of adjusting correctly the position of a magnetic head relative to a magnetic disc.

In order to achieve the above object, in a third aspect of the present invention, a disc recording and/or reproducing apparatus comprises:

a recording and/or reproducing head for recording and/or reproducing information on and/or from a disc-shaped recording medium;

a head mount on which the recording and/or reproducing head is mounted;

a head adjusting member disposed on the head mount for adjusting the position of the recording and/or reproducing head on the head mount;

a pressing member for pressing the disc-shaped recording medium against the recording and/or reproducing head; and a position adjusting member for adjusting the position of the pressing member in the pressing direction of the pressing member.

Here, the pressing member and the position adjusting member may be disposed on an arm having one end supported by the head mount and biased to rotate toward the recording and/or reproducing head. The head adjusting member may have a first adjusting member for adjusting a position of the head in the radial direction of the disc-shaped recording medium and a second adjusting member for adjusting a position of the head in the tangential direction of the disc-shaped recording medium.

It is a fourth object of the present invention to provide a disc recording and/or reproducing apparatus capable of preventing the deviation between a track and a magnetic head.

In order to achieve the above object, in a fourth aspect of the present invention, a disc recording and/or reproducing apparatus comprises:

a recording and/or reproducing head for recording and/or reproducing information on and/or from a disc-shaped recording medium;

a head mount on which the recording and/or reproducing head is mounted; and a head positioning member having a cam engaged with the head mount, so that in response to the displacement of the cam surface, the head mount is displaced so as to position the recording and/or reproducing head on the disc-shaped recording medium, the head positioning member being made of a material having a coefficient of thermal expansion similar to that of the base of the disc-shaped recording medium.

Here, the cam can rotatably surround a member which surrounds a rotary shaft for rotating the disc-shaped recording medium without preventing the rotation thereof. The head positioning member can be made of a synthetic resin material.

It is a fifth object of the present invention to provide a disc recording and/or reproducing apparatus capable of detecting correctly the outermost track position with a simple mechanism.

In order to achieve the above object, in a fifth aspect of the present invention, a disc recording and/or reproducing apparatus comprises:

a recording and/or reproducing head for recording and/or reproducing information on and/or from a disc-shaped recording medium;

a head mount on which the recording and/or reproducing head is mounted;

a head positioning member which has a cam engaged with the head mount, so that in response to the displacement of the cam, the head mount is displaced so as to position the recording and/or reproducing head on the disc-shaped recording medium;

an indicating member disposed to correspond to a predetermined cam surface of the cam for positioning the recording and/or reproducing head to the outermost position on the disc-shaped recording medium;

detection means for detecting the indicating member; and control means responsive to the detecting means for confirming that the recording and/or reproducing head is positioned to the outermost position on the disc-shaped recording medium and for controlling the drive of the head positioning member on the basis of the detected position of the recording and/or reproducing head on the disc-shaped recording medium.

Here, the cam can rotatably surround a member which surrounds a rotary shaft for rotating the disc-shaped recording medium without preventing the rotation thereof.

The detection means may have a movable member in the form of a lever having a first portion engageable with the indicating member and a second portion whose displacement is detected by the detection means; and the distance between the pivotal point of the lever and the first portion can be shorter than the distance between the pivotal point of the lever and the second portion, so that the displacement of the second portion due to the engagement of the first portion with the indicating member is amplified in the second portion.

The detection means may have a non-contact sensor which is out of contact with the second portion of the lever. The sensor may be a light sensor comprising a light emitting element and a light receiving element. The light sensor may be a reflection type sensor which has a light emitting element and a light receiving element, both of which are disposed on one surface of the second portion of the lever. Alternatively, the light sensor may be a light-transmission type sensor which has a light emitting element and a light receiving element which are disposed on opposite sides of the second portion of the lever.

In a sixth aspect of the present invention, a magnetic disc recording and/or reproducing apparatus comprises:

a magnetic head for recording and/or reproducing information on and/or from a disc-shaped magnetic recording medium;

a head positioning member having a cam which is rotatable around a hollow member which surrounds a rotary shaft for rotating the disc-shaped magnetic recording medium without preventing the rotation of the rotary shaft, the cam being made of a material having a coefficient of thermal expansion substantially similar to that of the base of the disc-shaped magnetic recording medium, and the head positioning member being displaced by the rotation of the cam to position the magnetic head with respect to the disc-shaped magnetic recording medium;

a head mount having a portion in engagement with the cam and a mounting portion for mounting the magnetic head;

a guide member extending in the radial direction of the disc-shaped magnetic recording medium for guiding the head mount with a reduced sliding friction;

an adjusting member mounted on the head mount for adjusting the position and/or condition of confrontation; i.e. contact or non-contact, of the magnetic head mounted on the head mount with respect to the disc-shaped magnetic recording medium; a biasing member for biasing the head mount toward the hollow member, so that the outer periphery of the hollow member is made into contact with the inner periphery of the head positioning member at a position in the direction in which the head mount is forced to move;

detection means disposed to correspond to a predetermined cam surface of the cam in the head positioning member for detecting that the magnetic head is positioned to the outermost position on the disc-shaped magnetic recording medium; and control means responsive to the output signal from the detection means for controlling the drive of the head positioning member.

The above and other objects, effects, features and advantages of the present invention will become more apparent from the following description of preferred embodiments thereof taken in conjunction with the accompanying drawings.

BRIEF DESCRIPTION OF THE DRAWINGS

FIG. 4 is a sectional view taken along line B—B in FIG. 2;

FIG. 9 is an exploded perspective view showing one embodiment of a cassette loading mechanism;

FIG. 10 is a perspective view showing the assembled cassette loading mechanism;

FIG. 12 is a sectional view showing the cassette loading mechanism into which a cassette is completely loaded;

FIGS. 13A-13G are schematic views used to explain the operation of a roller when loading the FIG. 14 is a sectional view showing the cassette loading mechanism before the cassette is lowered;

FIG. 20A is a block diagram showing one embodiment of the control circuit;

FIGS. 22A-22C are graphs illustrating reproduced output characteristics corresponding to the recording conditions shown in FIGS. 21B-21D, respectively;

FIG. 23A is a top plan view showing a magnetic head;

FIG. 23B is a sectional view taken along line D—D in FIG. 23A;

DETAILED DESCRIPTION OF THE PREFERRED EMBODIMENTS

Figure 1:
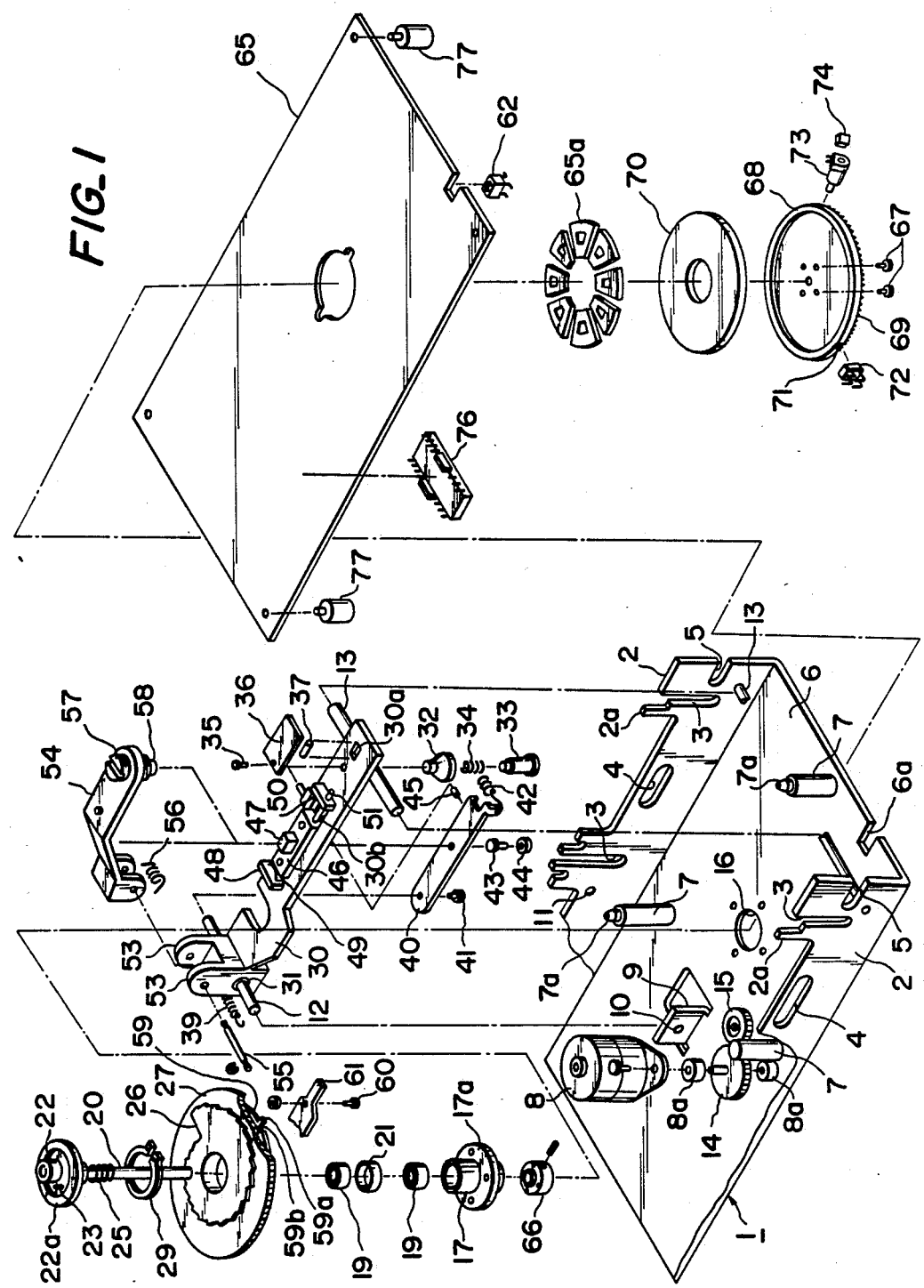
FIG. 1 is an exploded perspective view showing a magnetic disc and a head drive mechanism used to explain a first embodiment of a construction of a magnetic disc recording and/or reproducing apparatus for a case in which the present invention is applied to such an apparatus.
Figure 2:
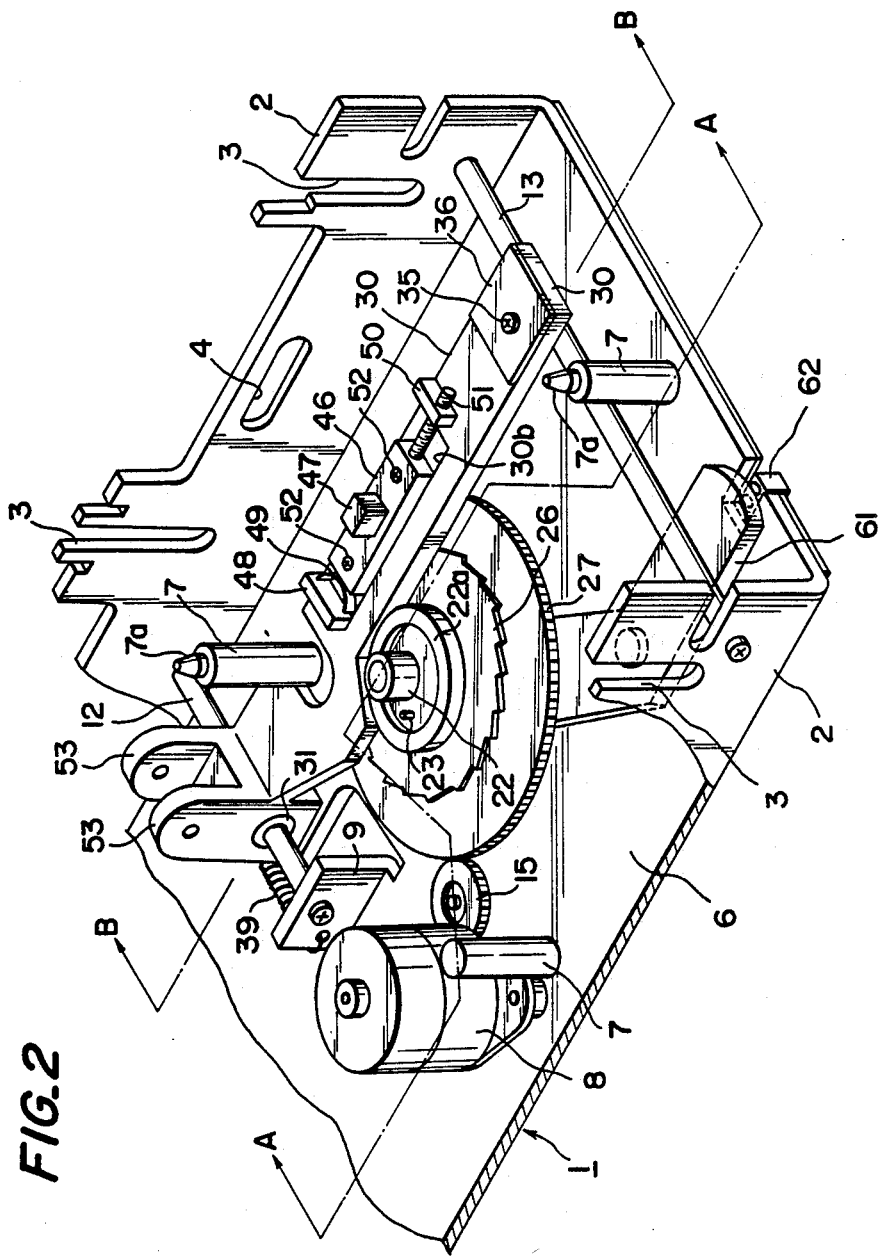
FIG. 2 is a perspective view showing a chassis upon which the head drive mechanism is mounted.

FIGS. 1 and 2 show one embodiment of a magnetic recording and/or reproducing apparatus for the case in which that the present invention is applied to such an apparatus. Here, a magnetic disc recording and/or reproducing apparatus is assembled on a chassis 1 as a base. The chassis 1 is mainly formed of a frame having a U shape and has two upright side plates 2. Guide slots 3 and 3 are formed at opposite positions of the side plates 2 and 2 and are extended downward from the upper edges of the side plates 2 and 2. The guide slots 3 and 3 are in an opposed relationship with each other and are adapted to receive therein rollers projected from a cassette guide to be described below.

Guide slots 4 and 4 are horizontally elongated between the guide slots 3 and 3 in the side plates 2 and 2 and are in an opposed relationship with each other between the guide slots 3 and 3. In the front edges of the side plates 2 and 2, guide slots 5 and 5 are horizontally extended. These guide slots 4 and 4 and the guide slots 5 and 5 are adapted to receive therein guide rollers of a slide frame to be described below.

Three positioning pins 7, 7 and 7 are extruded upright from a bottom plate 6 of the chassis 1 at predetermined positions.

These pins 7, 7 and 7 are used to vertically position a cassette to be described below.

A pulse motor 8 for displacing a magnetic head is secured on one side of the bottom plate 6 of the chassis 1 by studs 8a and 8a. A projection 9 is cut and protruded from the bottom plate 6 adjacent to the pulse motor 8 and has a hole 10. On one of the side plates 2 and 2, a hole 11 is formed which is in an opposed relationship with the hole 10 of the upright projection 9. These holes 10 and 11 are used to mount a guide shaft 12 which guides a head mounting base to be described below.

A guide bar 13 is extended in parallel with the guide shaft 12 between the side plates 2 on the front side of the chassis 1.

The output shaft of the pulse motor 8 which extends downwardly carries a drive gear 14 which in turn is in mesh with a gear 15 rotatably mounted on the bottom plate 6.

An aperture 16 is formed substantially at the center of the base plate 6 and is adapted to receive therein a boss 17 which supports a magnetic disc drive mechanism.

Figure 3:
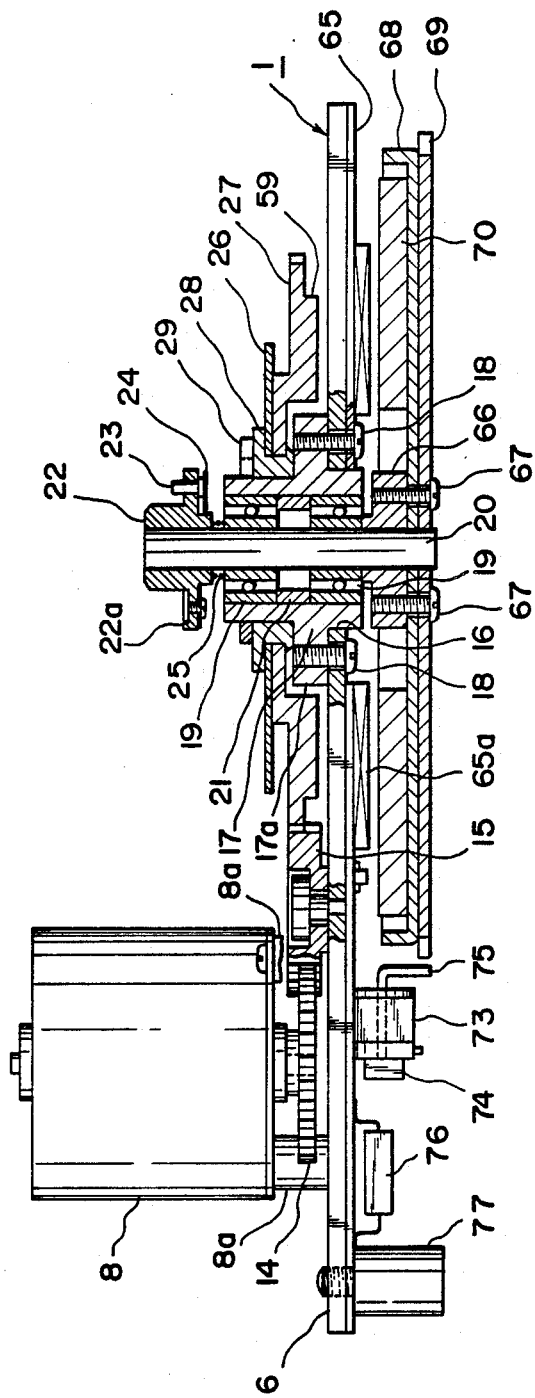
FIG. 3 is a sectional view taken along line A—A in FIG. 2.

As shown in FIG. 3, the boss 17 has a flange 17a extended radially outwardly from the central portion thereof. The boss 17 is stacked on the bottom plate 6 with the lower portion of the boss 17 being inserted into the aperture 16 and the flange 17a of the boss 17 is securely attached to the bottom plate 6 with screws 18 and 18.

A rotary shaft 20 is rotatably supported by a pair of bearings 19 and 19 which are vertically spaced apart within the boss 17. A collar 21 is interposed between the bearings 19 and 19. The outer rings of the bearings 19 and 19 are pressure-fitted into the boss 17.

A coupler 22 is securely fixed to the upper end of the rotary shaft 20 and is adapted to engage with the center hub of a magnetic disc. The coupler 22 has a flange 22a into which a positioning pin 23 is vertically movably engaged.

The lower end of the pin 23 is securely fixed to a free end of a leaf spring 24 on the lower surface side of the flange 22a, so that the pin 23 is normally biased upward.

A spring 25 is loaded between the lower surface of the coupler 22 and the inner ring of the upper bearing 19, so that the inner ring is biased downwardly. As a results, the inner ring is deviated relative to the outer ring, so that uniform contact between the inner and outer rings and the bearing balls is ensured and consequently the play of the inner and outer rings can be eliminated. As a consequence, the rotary shaft 20 is prevented from vibrating.

A gear 27 with a cam 26 formed over the upper surface thereof is securely fitted through a boss 28 to the boss 17. The gear 27 is in mesh with the gear 15 so that the rotation of the pulse motor 8 is transmitted to the cam 26. A retaining ring 29 is fitted over the boss 28 so that the cam 26 is prevented from being pulled out.

Figure 5A:
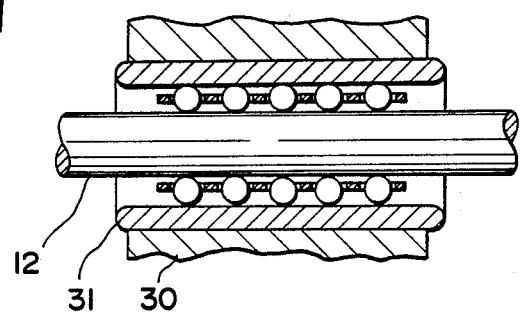
FIG. 5A is a sectional view showing an embodiment of a construction of one bearing of the head mount.

In FIGS. 1 and 2, reference numeral 30 denotes a head mount which is in the form of an elongated plate. One end of the head mount 30 is slidably engaged into the guide shaft 12 through a linear bearing 31 as shown in FIGS. 4 and 5A. The other end of the head mount 30, which is a free end, is supported by the other guide shaft 13 and is slidably guided.

Figure 5B:
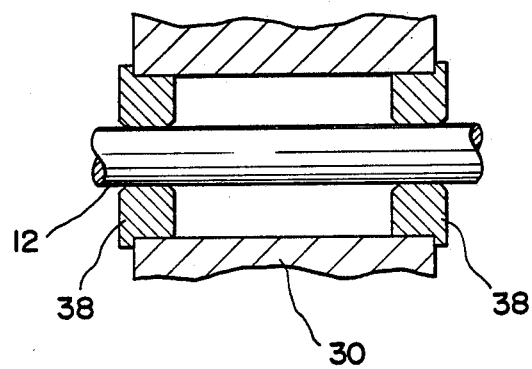
FIG. 5B is a sectional view showing another embodiment of a construction of the bearing of the head mount.
Figure 5C:
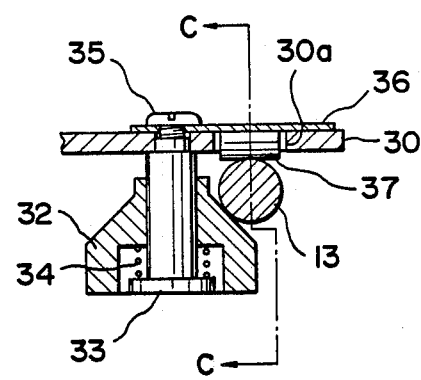
FIG. 5C is a sectional view showing an embodiment of a construction of the other bearing of the head mount.
Figure 5D:
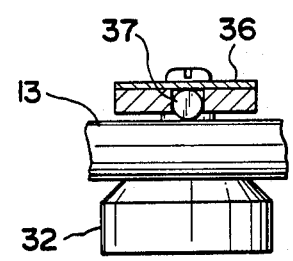
FIG. 5D is a sectional view taken along line C—C in FIG. 5C.

As best shown in FIGS. 5C and 5D, a shaft 33 is extended downward from the free end of the head mount 30 and the shaft 33 rotatably carries a roller 32 in the form of a corn. A spring 34 is loaded between the shaft 33 and the roller 32 so that the roller 32 is normally biased upwardly.

The shaft 33 is securely fixed to the head mount 30 by a screw 35. One end of a leaf spring 36 is also securely fixed to the upper side of the head mount 30 by the screw 35.

The head mount 30 has an opening 30a which is covered by the leaf spring 36. A roller 37 is rotatably engaged into the opening 30a and is perpendicular to the guide shaft 13.

As a result, the guide shaft 13 is elastically clamped between the conical surface of the roller 32 and the roller 37 so that the head mount 30 is slidable relative to the guide shaft 13.

As described above, the shafts 12 and 13 which guide the head mount 30 are supported by the linear bearings and the bearing member which utilizes rotary friction of the roller, so that wear can be reduced to a minimum. Accordingly, the head mount 30 can be displaced smoothly, as compared with bearings utilizing sliding friction.

As a result, a pulse motor which is compact in size and light in weight with a small power consumption and is therefore inexpensive can be used as the pulse motor 8.

Alternatively, as shown in FIG. 5B, the guide shaft 12 may be supported by bearing members 38 which utilize sliding friction. When the bearing member 38 is made of a material such as ruby which is very expensive but excellent in wear resistance, a compact and inexpensive pulse motor may be used as the pulse motor 8.

A spring 39 is extended between the head mount 30 and the upright projection 9, so that the head mount 30 is normally biased to move toward the rotary shaft 20.

The head mount 30 is disposed above the cam 26. A lever 40 has one end which is rotatably supported to the undersurface of the head mount 30 by a screw 41.

A spring 42 is extended between the other end of this lever 40 and the head mount 30, so that the lever 41 is normally biased to rotate in the counterclockwise direction in FIG. 1.

A roller 44 made of metal or a synthetic resin, but usually metal is rotatably supported to the undersurface of the lever 40 by a pin 43 and is in engagement with the cam surface of the cam 26.

Figure 6:
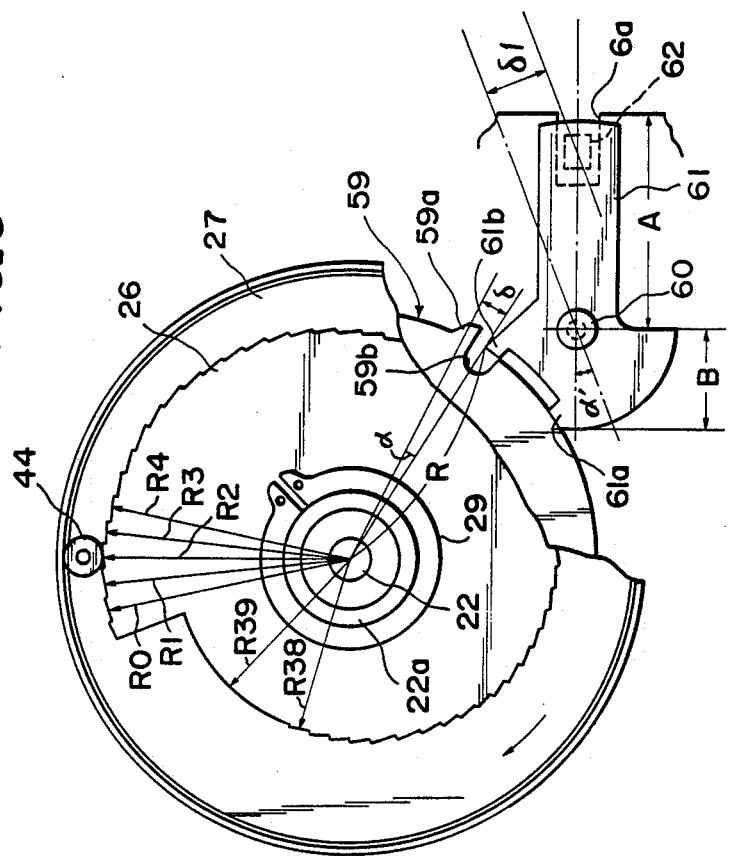
FIG. 6 is a schematic view showing a construction of an outermost track detecting mechanism.

As shown in FIG. 6, the cam 26 is roughly in the form of a spiral as a whole and has a plurality of cam portions with a saw-tooth or step-like shape. When a magnetic disc has 40 tracks, the cam 26 has 40 or more cam portions corresponding to the number of tracks.

In FIG. 6, the cam portion is so designed that $R_0$ represents the maximum radius and $R_{39}$ represents the minimum radius. Therefore, a magnetic head can move from the outermost track to the innermost track.

The cam 26 is rotated by the pulse motor 8. That is, the rotation of the pulse motor 8 is transmitted to the cam 26 through the gears 14, 15 and 27.

For instance, the pulse motor 8 is so designed that in response to one drive pulse, the pulse motor 8 rotates by 18°. When the drive pulse is a positive phase pulse, the pulse motor 8 is rotated clockwise, and when the drive pulse is a negative phase pulse, the pulse motor 8 is rotated counterclockwise.

The gear ratios among the gears 14, 15 and 27 are so determined that when the pulse motor 8 rotates by 18°, the gear 27 is rotated by 6°, for example. Within a range of this angle of 6°, 40 cam portions with respective radii $R_0$–$R_{39}$ are formed.

Therefore, every time that the cam 26 is rotated by 6°, a magnetic head 47 is displaced by a distance equal to one track pitch. More particularly, the magnetic head 47 is displaced by 0.12 millimeters (mm), for instance, and the total displacement of the pitches of the 40 tracks is about 5 mm.

Figure 8A:
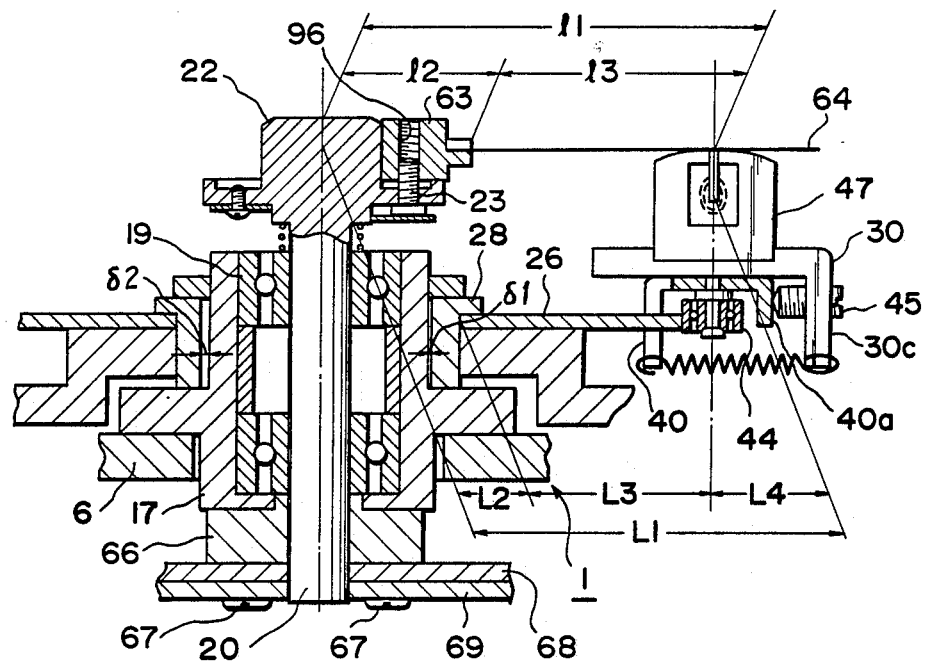
FIGS. 8A and 8B are a sectional view and a fragmentary side view showing a track positioning mechanism, respectively.
Figure 8B:
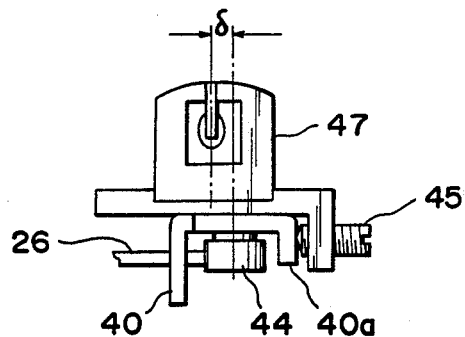
Figure 11:
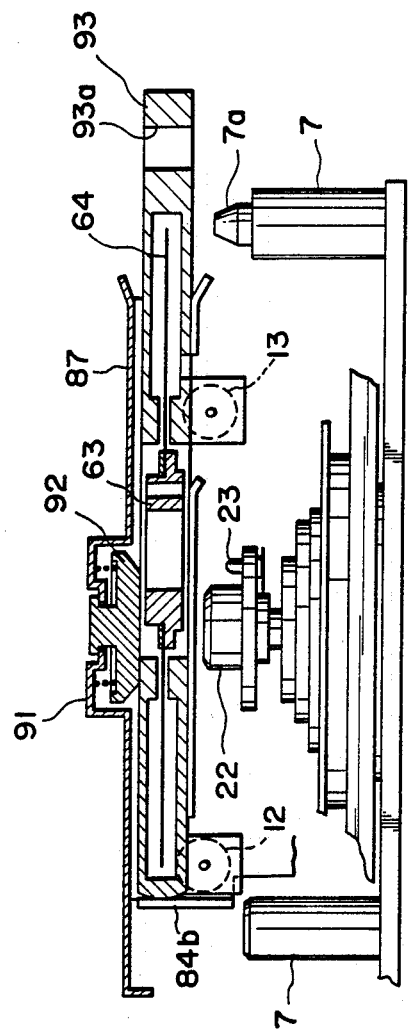
FIG. 11 is a sectional view showing the cassette loading mechanism immediately after the insertion of a cassette.

As shown in FIGS. 8A and 8B, an adjusting screw 45 is threadably engaged with a downwardly bent portion 30c which is protruded from the head mount 30 in the middle of the longitudinal direction thereof The adjusting screw 45 is engaged with a downwardly bent portion 40a at the free end of the lever 40. By tightening or loosening the adjusting screw 45, the position of the lever 40 can be adjusted.

In the middle of the longitudinal direction of the head mount 30 formed is a longitudinally elongated opening 30b, as shown in FIG. 4, into which the magnetic head 47 is disposed by a supporting member 46.

An arcuate leaf spring 49 is provided between one end of the supporting member 46 and an upright projection 48 extruded form one end of the elongated opening 30b. An adjusting screw 51 is threadably engaged with an upright projection 50 extended upwardly from the other end of the elongated opening 30b. The leading end of the adjusting screw 51 engages with the other end of the supporting member 46 which is remote form the spring 49.

It follows, therefore, that the position of the supporting member 46 can be adjusted by tightening or loosening the adjusting screw 51, so that the position of the magnetic head 47 can be adjusted. In other words, the displacement path of the magnetic head 47 relative to the center of a magnetic disc can be correctly adjusted by the adjusting screw 51.

After the magnetic head 47 has been correctly adjusted by the adjusting screw 51, the supporting member 46 is securely fixed to the head mount 30 with screws 52, so that the magnetic head 47 is mounted to the head mount 30.

Brackets 53 and 53 are extended from the end of the head mount 30 on the side of the guide shaft 12 to rotatably support one end of a pad arm 54 with a pin 55, as shown in FIGS. 1 and 4.

A torsional coil spring 56 is wound around the pin 55, so that the pad arm 54 is normally biased to rotate in the clockwise direction in FIG. 4.

The leading end of the pad arm 54 is extended to the space above the magnetic head 47. An adjusting screw 57 is threadably engaged with the leading end of the pad arm 54 in opposed relationship with the magnetic head 47. A pad 58 is attached to the lower end of the adjusting screw 57 so as to push a magnetic disc toward the magnetic head 47.

Therefore, by tightening or loosening the adjusting screw 57, the degree to which the pad 58 is parallel to the magnetic head 47 and the pad pressure can be adjusted.

A control plate 59 is formed integrally with the undersurface of the gear 27, as shown in FIG. 6, and has a projection 59a. A notch 59b is formed at the base of the projection 59a.

A lever 61 is pivotably fixed with a pin 60 to the base plate 6 adjacent to the control plate 59. The lever 61 has two projections 61a and 61b extended from one end of the lever 61 and spaced apart from each other by a predetermined distance. These projections 61a and 61b are normally in contact with the outer periphery of the control plate 59.

The other end portion of the lever 61 is elongated in the longitudinal direction and is positioned to close the upper surface of a notch 6a formed at the edge on the front side of the base plate 6. A sensor 62 is disposed in the notch 6a. The sensor 62 comprises, for instance, a light emitting element and a light receiving element. The sensor 62 always receives light reflected from the lower surface of the other end of the lever 61 so as to monitor whether or not the lever 61 is located at a predetermined position. Further, the sensor 62 may be a light sensor of the light transmission type having light emitting and receiving elements disposed in opposed relationship on the respective sides of the surfaces of the lever 61. Alternatively, the sensor 62 may be of the magnetic detection type.

The position of the lever 61, the projection 59a of the control plate 59 and the cam portion with the maximum radius $R_0$ of the cam 26 have the following relationship.

That is, when the roller 44 reaches the cam portion with the maximum radius $R_0$ of the cam 26, the projection 59a of the control plate 59 engages with the projection 61b of the lever 61.

Therefore, as shown in FIG. 6, when the roller 44 is in engagement with the cam portion with the radius $R_1$ of the cam 26, the projection 61b of the lever 61 is released from the projection 59a of the control plate 59, so that the other end of the lever 61 is positioned above the sensor 62.

Under the condition, the projections 61a and 61b of the lever 61 are brought into contact with the periphery of the control plate 59, so that the rotation of the lever 61 is prevented.

When the cam 26 is advanced by one step by the pulse motor 8, the roller 44 rides over the cam portion with the maximum radius $R_0$, so that the magnetic head 47 and the head mount 30 are brought to a position corresponding to the outermost track.

Figure 7:
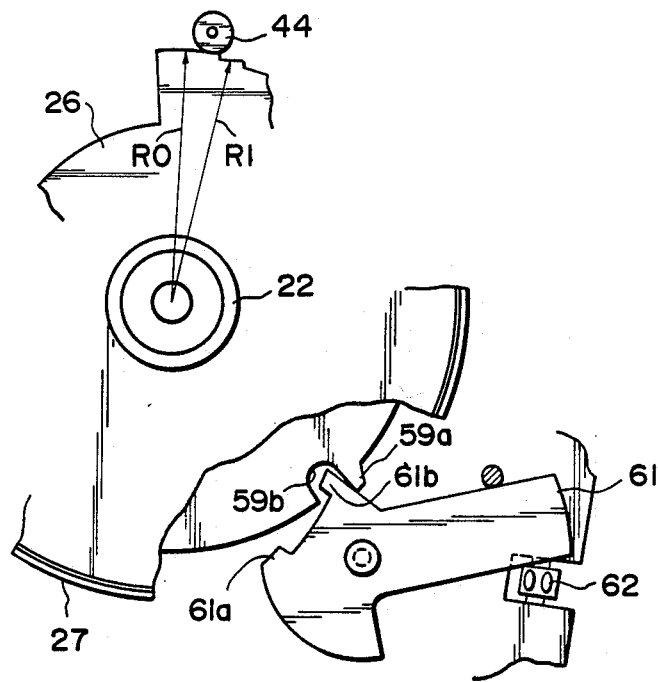
FIG. 7 is an explanatory view used to explain the operation of the outermost track detecting mechanism.

In this situation, as shown in FIG. 7, the projection 59a of the control plate 59 engages with the projection 61b of the lever 61, so that the lever 61 is rotated in the counterclockwise direction in FIG. 7 and consequently the projection 61b of the lever 61 engages with the notch 59b of the control plate 59. The other end of the lever 61 is, therefore, displaced away from the upper position of the sensor 62, so that the sensor 62 is interrupted. As a result, it is detected that the magnetic head 47 has reached the outermost track.

Therefore, when the outermost track is referred to as "0" track and if it is ensured that the position of the outermost track is detected by the above-described mechanism and the magnetic head 47 is brought to the position corresponding to the outermost track when a power supply is turned on, then the position of the magnetic head 47 corresponds to the "0" track at the time of starting. When, for instance, five pulses are applied to the pulse motor 8, the magnetic head 47 is brought to the position corresponding to the fifth track. When, for instance, ten pulses are applied to the pulse motor 8, the magnetic head 47 is brought to the position corresponding to the tenth track and so on. Thus, any desired track can be selected by applying a desired number of pulses to the pulse motor 8 at the position of track "0".

The present position of the magnetic head 47 is stored in the memory of a digital processing system by storing the number of such input pulses.

For instance, the control plate 59 and the lever 61 have the following specific dimensions.

As shown in FIG. 6, when it is assumed that the radius R of the control plate 59 is R=15 mm and the rotation angle $\alpha$ per one step is $\alpha=6°$, then the peripheral displacement $\delta$ of the control plate 59 is $$\delta = \tan 6° \times 15 \text{ mm} \simeq 1.6 \text{ mm}.$$

If it is further assumed that the distance B between the pin 60 of the lever 61 and one end of the lever 61 is B=5 mm; the distance A between the pin 60 and the other end of the lever 61 is A=13 mm; the displacement of the other end of the lever 61 is $\delta_1$; and the angle of rotation of the lever 61 is $\alpha'$, then, $$\alpha' = (15/5) \times 6° = 18°$$

$$\delta_1 \simeq \tan 18° \times 13 \text{ mm} \simeq 4.2 \text{ mm}$$

Therefore, when the periphery of the control plate 59 is rotated by 1.6 mm, the lever 61 rotates about 18° because the lever ratio of the lever 61 is 3.

As a result, the other or outer end of the lever is displaced by 4.2 mm, which is sufficient to cover and uncover the sensor 62 whose size is assumed to be 3 mm.

While it is of course possible that if the sensitivity of the sensor 62 is enhanced, a displacement of the order of 1.6 mm of the projection 59a of the control plate 59 can be satisfactorily detected, the lever 61 of the type described above can be employed to detect the displacement of the control plate 59 in a simple and inexpensive manner.

When this lever 61 is employed, the rotation of the control plate 59 and accordingly the rotation of the cam 26 can be detected in the outer space where no other parts exist. As a result, there can be provided a detection mechanism without limitation of space.

A magnetic disc can be loaded on the coupler 22 provided at the upper end of the rotary shaft 20.

Most magnetic discs are generally made of plastic or synthetic resin except for the center hub portion. On the other hand, a magnetic disc drive mechanism is mostly made of metal, so that there arises a problem due to the difference between coefficients of thermal expansion.

This problem will be discussed by using particular example. Referring now to FIG. 8A, it is assumed that the distance between the axis of the rotary shaft 20 and the center of the magnetic head 47 or a certain track is $l_1$; the distance between the periphery of a center hub 63 of a magnetic disc 64 and the axis of the rotary shaft 20 is $l_2$; and the distance between the periphery of the center hub 63 and that track is $l_3$. Then, the portion $l_2$ is made of metal and the portion $l_3$ is made of plastic. For instance, if $l_1=20$ mm; and $l_2=8$ mm, then $l_3$ is 12 mm.

Distance $L_1$ between the axis of the rotary shaft and the track in question consists of distance $L_2$ between the axis of the rotary shaft 20 and the periphery of the boss 28; distance $L_3$ between the boss 28 and the center or rotational axis of roller 44; and distance $L_4$ between the center of rotational axis of the roller 44 and the track. Here, the various parts disposed along this distance $L_1$ are made of metal.

It is now assumed that $L_2=8$ mm and $L_4=1.5$ mm. Since $L_1=20$ mm, $L_3=20-8-1.5=10.5$ mm.

It is now assumed that at 25° C. the error between $L_1$ and $l_1$ is made zero. When the temperature rises by 20° C. to 45°C., the following problem occurs.

It is further assumed that the coefficient of linear expansion of the metal is $16 \times 10^{-6}$ mm/° C. and the coefficient of linear expansion of the synthetic resin film is $17 \times 10^{-5}$ mm/° C. The cam 26 is made of metal, as in a conventional apparatus. Distances $l_1$ and $L_1$ are obtained from 1, $(1+\alpha, \Delta t$, where $\alpha$, is a coefficient of linear expansion and $\Delta t$ is a temperature difference. The results are as follows:

$$l_1 = l_2 + l_3 = (8 + 8 \times 20 \times 16 \times 10^{-6}) +$$
$$(12 + 12 \times 20 \times 17 \times 10^{-5})$$
$$= 20.043 \text{ mm}$$

-continued $$L_1 = L_2 + L_4 + L_3$$
$$= (8 + 8 \times 20 \times 16 \times 10^{-6}) +$$
$$(1.5 + 1.5 \times 20 \times 16 \times 10^{-6}) +$$
$$(10.5 + 10.5 \times 20 \times 16 \times 10^{-6})$$
$$= 20.006 \text{ mm.}$$

That is, when the temperature rises by 20° C., the difference between $L_1$ and $l_1$ becomes 20.043−20.006=37 μm. As a result, the data on the magnetic disc 64 cannot be correctly read out.

Therefore, in the present embodiment of the present invention, the cam 26 is made of a synthetic resin material such as polyethylene terephthalate having a coefficient of linear expansion which is $17 \times 10^{-5}$, that is, substantially the same to or similar to that of the magnetic disc 64. Then, $$L_1 = (8 + 8 \times 20 \times 16 \times 10^{-6}) +$$
$$(1.5 + 1.5 \times 20 \times 16 \times 10^{-6}) +$$
$$(10.5 + 10.5 \times 20 \times 17 \times 10^{-5})$$
$$= 20.038 \text{ mm.}$$

That is, by changing the material of the cam 26 as described above, the difference between $L_1$ and $l_1$ becomes 20.043−20.038=5 μm. Therefore, adverse effects due to the thermal expansion can be eliminated to a satisfactory degree.

According to the present embodiment of the present invention, the position of the magnetic head 47 relative to the center of the roller 44 can be adjusted by the adjusting screw 45. Therefore, while inspecting the position of the magnetic head 47 through a microscope or the like, $L_1$ can be exactly set to 20 mm.

FIG. 8B illustrates that the center of the magnetic head 47 is deviated from the center of the roller 44 by $\epsilon$.

Furthermore, the cam 26 is rotatable, so that, as shown in FIG. 8A, there exists clearances $\epsilon_1$ and $\epsilon_2$ between the bosses 17 and 28.

Therefore, when the cam 26 is rotated, the clearances $\epsilon_1$ and $\epsilon_2$ are always varied, so that this variation directly influences distance $L_1$.

In order to eliminate this influence, according to the present embodiment, the clearance $\epsilon_1$ between the bosses 17 and 28 is always maintained to be zero. To this end, the spring 39 is expanded between the head mount 30 and the projection 9, so that the head mount 30 is normally biased toward the boss 28. The lever 40 is biased to be pressed against the adjusting screw 45 attached to the head mount 30 under the force of the spring 42, so that the magnetic head 47 is prevented from being deviated from a track.

The rotary shaft 20 is extended downwardly through the bottom plate 6 of the chassis 1 and has a member, i.e., a coil 65a which constitutes a motor together with a printed circuit board 65 securely fixed to the undersurface of the bottom plate 6 of the chassis 1, as shown in FIG. 3. That is, the coil 65a is secured to the undersurface of the bottom plate 6 of the chassis 1 via an insulation layer.

A boss 66 is fitted to the lower end of the rotary shaft 20. A saucer-shaped yoke 68 and a gear 69 are securely fixed with screws 67 to the boss 66. A ring-shaped permanent magnet 70 is securely disposed on the yoke 68 in opposed relationship with the coil 65a. The permanent magnet 70 is magnetized in the fashion of plural magnetic poles.

As shown in FIG. 1, a non-reflecting plate 71 of a small size is securely attached to the outer periphery of the yoke 68 at a predetermined position of the yoke 68 and a sensor 72 for detecting the non-reflecting plate 71 is securely attached to the printed circuit board 65, so that the sensor 72 produces one pulse per one rotation of the yoke 68.

The yoke 68 is plated with nickel aluminum or the like, so that it is ensured that the sensor 72 consisting of a light emitting element and a light receiving element can positively detect the existence of the non-reflecting plate 71. Thus, the output signal derived from the sensor 72 can be used as an index signal.

Reference numeral 73 denotes a sensor for detecting the rotational speed of the motor formed by the coil 65a, the yoke 68 and the permanent magnet 70.

The sensor 73 is securely attached to the printed circuit board 65. The sensor 73 includes a permanent magnet 74 and a yoke 75 for mounting the permanent magnet 74. As shown in FIG. 3, the yoke 75 is disposed in the vicinity of the gear 69.

In FIGS. 1 and 3, reference numeral 76 represents an electronic part such as an LSI; and reference numeral 77 denotes screws for fixedly mounting the printed circuit board 65 on the chassis 1.

The gear 69 has a large diameter and is made of iron material. When the teeth of the gear 69 approach the yoke 75, magnetic flux is varied on the side of the sensor 73, so that a current flows through the coil in the sensor 73. This current can be derived as an output signal.

The above-described motor formed by the coil 65a, the yoke 78 and the permanent magnet 70 drives to rotate a magnetic disc. This motor is so designed and constructed that it rotates at 300 rpm.

In order that the motor can rotate uniformly and constantly at a predetermined rotational speed of 300 rpm, the time period required for one rotation, i.e., 200 milliseconds (ms) is further divided so that the correct rotation control can be ensured.

More specially, the gear 69 has a diameter of 50 mm and a module of 0.25, and the number of teeth is 200. In this case, variations in rotation of the motor can be monitored by the sensor 73 at a time interval of 200 ms÷200=1 ms.

The printed circuit board 65 is made of a thin insulating board and is securely mounted on the iron or steel chassis 1. The magnetic flux produced when current flows through the coil 65a passes a magnetic circuit established between the chassis 1 and the yoke 68, so that the permanent magnet 70 and, therefore, the yoke 68 and the gear 69 are rotated.

As described above, the printed circuit board 65 is fixed to the steel or iron chassis 1, so that it becomes possible to reduce the distance between the permanent magnet 70 and the chassis 1. As a result, the efficiency of the magnetic circuit is improved.

When the chassis 1 is made of an iron or steel plate and is also utilized to form a printed circuit board, it becomes possible to reduce the thickness of the motor by the thickness of the printed circuit board 65 which constitutes the motor. Furthermore, the number of parts can also be reduced.

Further, the permanent magnet 70 has a magnetic force attracting the chassis 1 toward the magnet 70, so that the inner ring of the lower bearing 19 is forced upwardly by the boss 66. As a result, the play of the bearing 19 can be absorbed, so that oscillation or vibration of the rotary shaft 20 can be prevented by the upper and lower bearings 19 and 19.

The inner and outer diameters of the boss 17 which is securely attached to the chassis 1 are machined with reference to the stationary portion of the chassis 1. Therefore, the inner and outer diameters of the boss 17 can be machined with an accuracy of the order of 1-2 μm.

Because of this machining accuracy and the absorption of play by the bearings 19 and 19, the vibration of the rotary shaft 20 including the boss 17 can be maintained within 5 μm.

So far the drive mechanism has been described in detail and next a disc loading mechanism will be described.

The disc loading mechanism in accordance with the present invention has a construction as shown in FIGS. 9-16.

A sliding frame 78 has an opened bottom and opened front and rear sides. The sliding frame 78 rotatably carries rollers 79 and 79 and 79a and 79a on both sides thereof. These rollers 79 and 79 and 79a and 79a are slidably and rotatably fitted into the elongated slots 4 and 4 and the guide slots 5 and 5, respectively, which are formed on the side walls 2 and 2 of the chassis 1.

The sliding frame 78 has openings 78a and 78a at the upper corners of the right and left sides thereof. Projections 78b and 78b are protruded integrally from the top surface of the sliding frame 78 and are extended horizontally over the openings 78a and 78a. Springs 80 and 80 are expanded between the projections 78b and 78b and the projections 2a and 2a protruded from the side walls 2 and 2 of the chassis 1. Consequently, the sliding frame 78 is normally biased toward the front side of the chassis 1.

Rollers 81 and 81 are rotatably supported by projections 78d and 78d protruded from the lower ends of both the side plates of the sliding frame 78, so that the sliding frame 78 is slidable along the chassis 1 by the rollers 81 and 81.

A push button 82 is securely attached to a projection 78c protruded from one end of the sliding frame 78. Each of the right hand and left hand side plates of the sliding frame 78 has two elongated holes 83 and 83 which are inclined to the upper surface of the sliding frame 78 and are in parallel with each other. Sliding plates 84 and 84 are slidably disposed over the inner surfaces of the right hand and left hand side plates.

These sliding plates 84 and 84 are in the rectangular form and have lower ends in contact with shafts 81a and 81a with a small diameter of the rollers 81 and 81 which are in contact with the bottom plate 6 of the chassis 1.

Upright projections 84a and 84a extended from the upper side edges of the sliding plates 84 and 84 are fitted into the openings 78a and 78a of the sliding frame 78 as guide means. The sliding plates 84 and 84 have inwardly directed projections 84b at the end thereof.

Each of the sliding plates 84 and 84 has a pair of L-shaped openings 85 and 85 substantially in opposed relationship with the elongated openings 83 and 83 of the sliding frame 78. Inwardly directed projections 84c and 84c are protruded from the lower side edges of the sliding plates 84. Springs 86 and 86 are expanded between the projections 84c and 84c and the sliding frame 78.

A cassette guide 87 is disposed under the sliding frame 78. The cassette guide 87 is in the form of a flat frame and has right hand and left hand rails 87a and 87a which serve as a guide to a cassette 93. The cassette guide 87 has downwardly extended right and left projections 88 and 88 and pins 89 and 89 are horizontally outwardly extended from these projections 88 and 88 to rotatably carry rollers 90. The respective rollers 90 and 90 are rotatably fitted into the L-shaped openings 85 and 85 of the sliding frames 84 and the elongated holes 83 and 83 of the sliding frame 78.

The upper surface of the cassette guide 87 has an opening 87b at the center thereof. A frame 91 is integrally formed on the upper surface of the cassette guide 87 in such a way that the frame 91 bridges the opening 87b. The frame 91 is provided with a hub holder 92.

The cassette guide 87 has an opening 87c adjacent to the opening 87b through which the magnetic head 47 is exposed.

The above-described sliding frame 78, the two sliding plates 84 and 84 and the cassette guide 87 constitute the cassette loading mechanism.

Next, the operation of the cassette loading mechanism will be described.

Prior to the loading of a magnetic disc cassette 93, the sliding frames 78 and 78 are displaced rightward in FIGS. 9 and 14 by the forces of the springs 80 and 80.

Under these conditions, the rollers 90 and 90 are fitted into the guide slots 3 and 3 of the side plates 2 and 2 and, as shown in FIG. 14, are in contact with the upper ends of the elongated holes 83 and 83. Furthermore, it is seen that the rollers 90 and 90 are engaged with the horizontal portions 85a and 85a of the L-shaped openings 85 and 85. That is, movement of the rollers 90 and 90 is restricted by the guide slots 3 and 3, the elongated holes 83 and 83 and the L-shaped openings 85 and 85.

The sliding plates 84 and 84 are biased rightward in FIG. 14 by the force of the springs 86 and 86 and the cassette guide 87 is ready to receive the cassette 93 while the cassette guide 87 is positioned at an upper position defined by the horizontal portions 85a and 85a of the L-shaped openings 85 and 85.

When the cassette 93 is engaged with the rails 87a and 87a of the cassette guide 87 and then inserted inside under these conditions, the cassette 93 is guided by the rails 87a and 87a and led into the cassette guide 87.

In the meantime, the leading edge of the cassette 93 engages with the inwardly protruded projections 84b and 84b at the leading edges of the sliding plates 84 and 84, so that the sliding plates 84 and 84 are caused to advance forwardly against the force of the springs 86 and 86.

As the sliding plates 84 and 84 are displaced, the L-shaped openings 85 are also displaced, so that, as shown in FIGS. 13A and 13C, the rollers 90 and 90 which have been located in the guide slots 3 and 3 and the horizontal portions 85a and 85a of the L-shaped openings 85 and 85 drop into the vertical portions of the L-shaped openings 85 and 85. As a result, the guide rollers 90 and 90 are displaced downwardly in the guide slots 3 and 3 and the vertical portions of the L-shaped openings 85 and 85, as best shown in FIGS. 13B and 13D. That is, the cassette 93 is displaced downwardly together with the cassette guide 87.

When the cassette 93 is being inserted, the rollers 90 and 90 which are located at the upper ends of the elongated holes 83 and 83, as shown in FIG. 13E are displaced downwardly in the elongated holes 83 and 83, as best shown in FIG. 13F.

Figure 15:
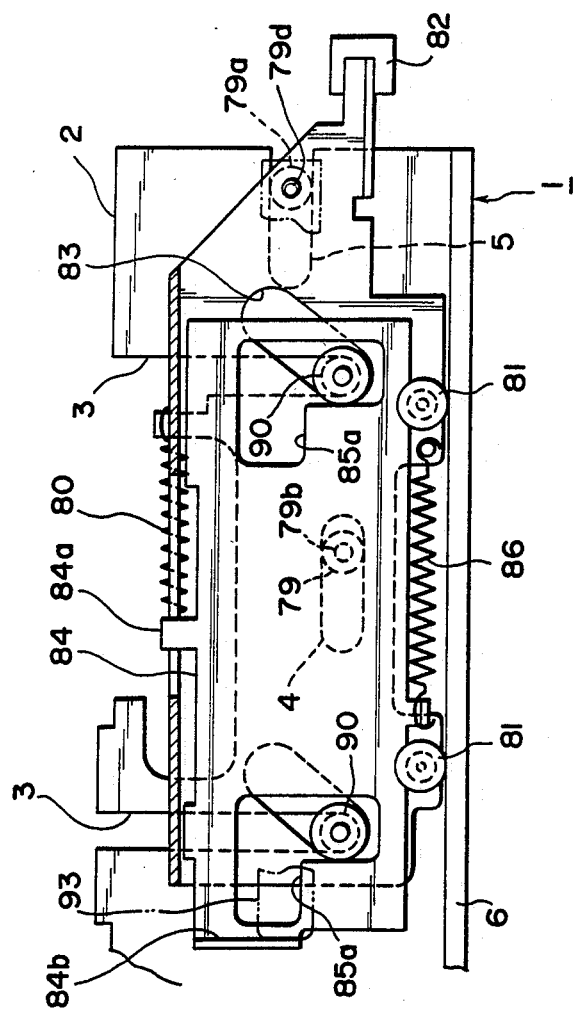
FIG. 15 is a sectional view of the cassette loading mechanism after the cassette has been lowered.

In the case of the displacement of the rollers 90 and 90, the rollers 90 and 90 push the right hand edges of the elongated holes 83 and 83, so that the sliding frame 78 is displaced rightward by a predetermined distance, as shown in FIG. 15.

When the cassette 93 as well as the cassette guide 87 are displaced downwardly in the manner described above, the two projections 7a and 7a of the two positioning pins 7 and 7 having the projections 7a and 7a of the three positioning pins 7 and 7 and 7 are fitted into two positioning holes 93a and 93a of the cassette 93, while the upper end of the pin 7 having no projection 7a engages with the undersurface of the cassette 93, so that the cassette 93 is held in position at a predetermined height, as shown in FIG. 12.

In this case, as best shown in FIG. 12, the coupler 22 engages with the center hub 63 of the magnetic disc 64 and the pin 23 is fitted into a positioning hole 96 of the center hub 63. The hub holder 92 is pressed against the upper surface of the center hub 63. This loading operation of the cassette 93 is carried out, while the rotary shaft 20 is rotating.

After the cassette 93 has been set in the manner described above, the mechanism is ready to record or reproduce information.

In order to unload the loaded cassette 93, the push button 82 is depressed. Then, the sliding frame 78 advances, so that the peripheries of the inclined elongated slots 83 and 83 push the rollers 90 and 90 upwardly. As a result, the cassette guide 87 is also pushed upwardly to return to its initial position.

When the cassette guide 87 is lifted so that the rollers 90 and 90 are also lifted, the rollers 90 and 90 are brought to the upper positions of the L-shaped openings 85 and 85. As a result, under the tensile force of the springs 86 and 86, the sliding plates 84 and 84 are displaced rightward as shown in FIG. 14, so that the rollers 90 and 90 engage with the horizontal portions 85a and 85a of the L-shaped openings 85 and 85. As a result, the inwardly extended projections 84b and 84b push the cassette 93, so that the cassette 93 is pushed forwardly from the edge portion of the cassette guide 87. Thus, the cassette 93 can be taken out.

Figure 16:
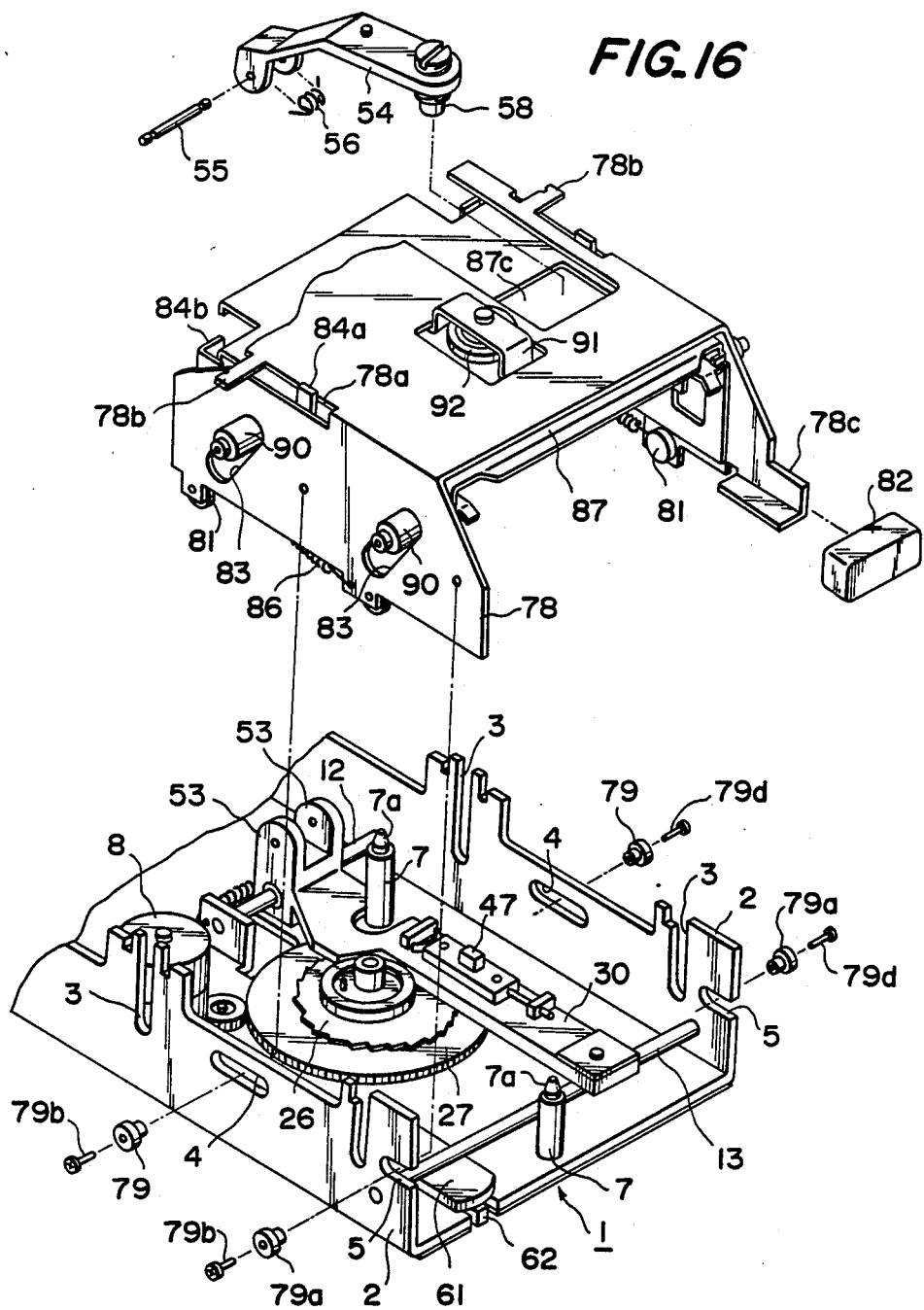
FIG. 16 is a perspective view showing the relationship between the cassette loading mechanism and the chassis.
Figure 17:
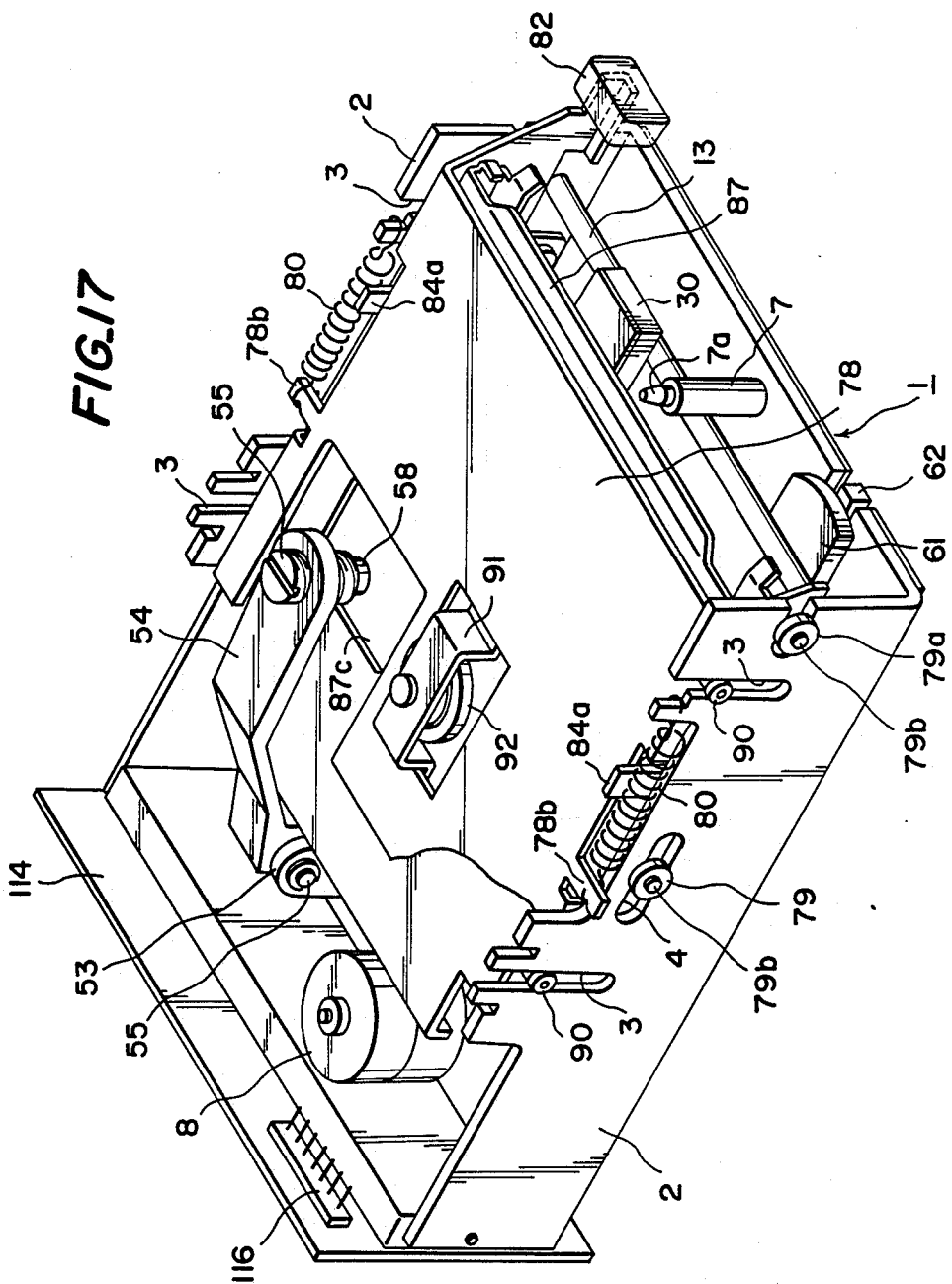
FIG. 17 is a perspective view showing the chassis upon which the cassette loading mechanism is mounted.

After the sliding frame 78, the sliding plates 84 and 84 and the cassette guide 87 are first assembled as shown in FIG. 16, the cassette loading mechanism thus assembled is disposed inside the side plates 2 and 2 of the chassis 1, while the rollers 79 and 79 and 79a and 79a are fitted into the guide slots 4 and 4, and the guide slots 5 and 5, respectively. Next, the side plates 2 and 2 of the chassis 1 are securely fixed to the side surfaces of the sliding frame 87 by screws 79b and 79b and 79d and 79d. Thus, the drive mechanism and the cassette loading mechanism can be assembled in a simple manner. Finally, the pad arm 54 is attached to the head mount 30.

FIG. 20A shows the block diagram of a control circuit in the magnetic disc recording and/or reproducing apparatus of the present embodiment.

The magnetic disc recording and/or reproducing apparatus of the present embodiment in accordance with the present invention is controlled by a computer 100 which is coupled to the magnetic disc recording and/or reproducing apparatus via lines; i.e., 34 input and output lines.

These 34 input and output lines are all controlled by digital signals.

The control circuit for the magnetic disc recording and/or reproducing apparatus comprises a digital processor 101 which is adapted to couple the computer 100 to the magnetic disc includes various interfaces and recording and/or reproducing apparatus and to amplify the output signals from the sensors 62, 72 and 73 of the magnetic disc recording and/or reproducing apparatus which are converted into digital signals. The digital processor 101 also includes a pulse motor drive circuit for driving the pulse motor 8 for bringing the magnetic head 47 to a desired track.

Connected to the digital processor 101 are a read amplifier 102 for amplifying the data read out by the magnetic head 47, a write amplifier 103 for amplifying the data to be written in the magnetic head 47, a read/write selection switch 104, an index amplifier 105 for amplifying the output from the sensor 72 which generates one pulse signal every time that the magnetic disc 64 makes one rotation, a track position detection amplifier 106 for amplifying the output from the sensor 62 which detects the "0" track position of the magnetic head 47 and a motor drive circuit 107 for driving the motors (65a, 70, 68) for rotating the magnetic disc 64.

The control circuit further includes a speed control circuit 108 for controlling the rotational speed of the disc rotating motor (65a, 70, 68). The speed control circuit 108 is connected to the motor drive circuit 107. The speed control is carried out in response to the signals transmitted through signal lines 109 and 110 from the digital processor 101, as will be described in more detail hereinafter.

The control circuit further includes an amplifier 111 for amplifying the output from the sensor 73 for monitoring the rotational speed of the disc rotating motor (65a, 70, 68). Further, reference numeral 112 denotes a television receiver, which is coupled to the digital processor 101.

In the present embodiment, while the disc rotating motor can be rotated at the same speed between recording and reproduction, as a matter of course, the rotational speed of the disc rotating motor can be varied between recording and reproduction in order to record information at a high density and to improve reliability.

For that purpose, when a recording instruction is applied from the computer 100 to the digital processor 101, the digital processor 101 applies a signal to the read/write selection switch 104, so that the magnetic head 47 is switched from the reproduction mode to the recording mode. At the same time, the write amplifier 103 is energized.

A low speed rotation instruction is transmitted from the processor 101 to the speed control circuit 108 through the signal line 110. The speed control circuit 108 confirms that the intervals of the signals transmitted from the amplifier 111 coincides with a speed control interval and thus judges a low speed rotation mode. Thereafter, recording information is applied to the magnetic head 47 from the computer 100 via the processor 101 and the write amplifier 103, so that the recording information is recorded on the magnetic disc.

On the other hand, when the computer 100 transmits a reproduction instruction, the read write selection switch 104 is switched to the read mode and the read amplifier 102 is energized. The speed control circuit 108 is switched to a high speed mode in response to the signal transmitted to the speed control circuit 108 from the processor 101 through the signal line 109. After the speed control circuit 108 confirms that the disc rotating motor is switched to the high speed rotation mode through the amplifier 111, the readout operation of the data stored in the magnetic disc is started and the data thus read out is inputted to the computer 100.

In the case in which it is desired that the recording and reproducing operations are performed at the same rotational speed, it is sufficient that a reference frequency for setting a reference high speed rotation of the speed control circuit 108 is set to the same frequency as in the case of the low speed rotation mode.

Figure 20B:
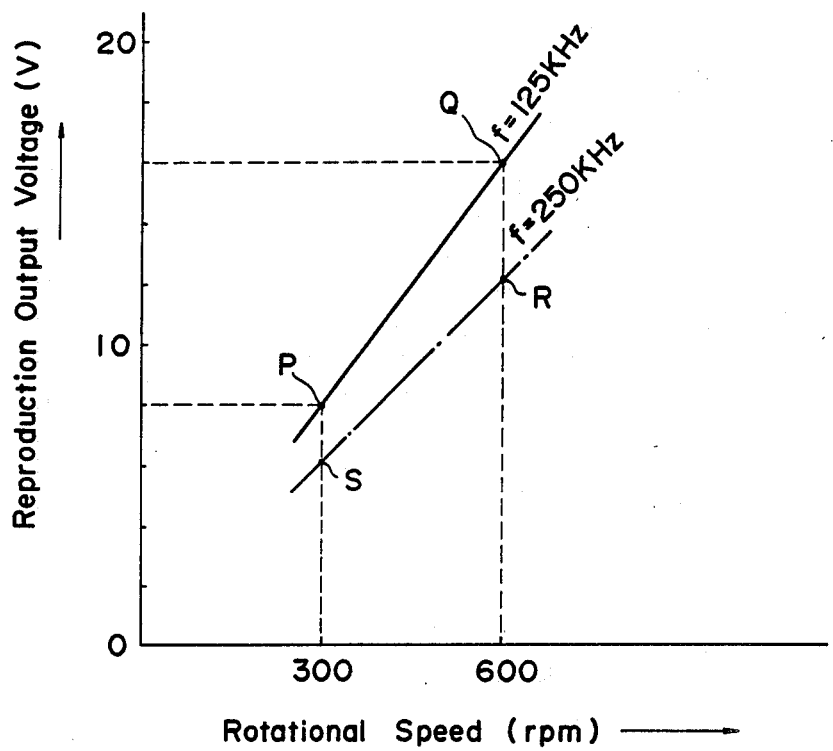
FIG. 20B is a graph illustrating the relationship between the rotational speed of a magnetic disc and the reproduced output voltage.

FIG. 20B shows the output characteristic of the magnetic head 47 when data is read out by changing the rotational speed of the magnetic disc 64 from 300 rpm to 600 rpm.

It is assumed that at original point P, the output from the magnetic head 47 was adjusted to be 0.8 V when the recording signal frequency was f=125 kHz and the rotational speed of the magnetic disc 64 is 300 rpm. Then, when the rotational speed was doubled to 600 rpm, point Q was obtained at which the output from the magnetic head 47 was substantially doubled.

When the recording signal frequency was doubled to 250 kHz, the magnetic recording density was increased so that point S was obtained at which the output from the magnetic head 47 was decreased by about 25%. When the rotational speed was doubled under these conditions, point R was obtained at which the output was doubled.

Accordingly, when the magnetic recording operation is carried out at the signal frequency of 250 kHz while the magnetic disc 64 is rotating at 300 rpm and when the reproducing operation is carried out at the same rotational speed, the output of 0.6 V is obtained as shown at point S. However, when the rotational speed is set at 600 rpm in the case of reproduction, the output of 1.2 V can be obtained as indicated by point R.

That is, an output voltage which is higher by 0.6 V can be obtained. Therefore, a satisfactorily high output voltage for digital processing can be obtained, and thus reliability can be improved even when the output is decreased due to variations in magnetic discs and losses in the magnetic circuit of the magnetic head 47.

In the case in which the video signal of the television receiver 112 is recorded on the magnetic disc 64, it is assumed that the rotational speed of the magnetic disc 64 is set to 3600 rpm, for example. Then, the picture or video signal of one field in the NTSC system can be recorded on one track.

In the case of recording the television video signal on the magnetic disc 64, the maximum recording signal threshold frequency is about 6.1 MHz. Therefore, it follows that if the rotational speed is increased by 3600 rpm÷300 rpm=12 times higher as described with reference to FIG. 20B, the output would increase. However, the recording signal frequency becomes 6.1 MHz÷250 kHz=24 times, so that the recording density is increased and the amplifier output becomes about 0.4–0.5 V. As a consequence, it is ensured that the television video signal can be recorded or reproduced on and from the magnetic disc 64, if the magnetic disc 64 is rotated at such a high rotational speed.

Figure 18:
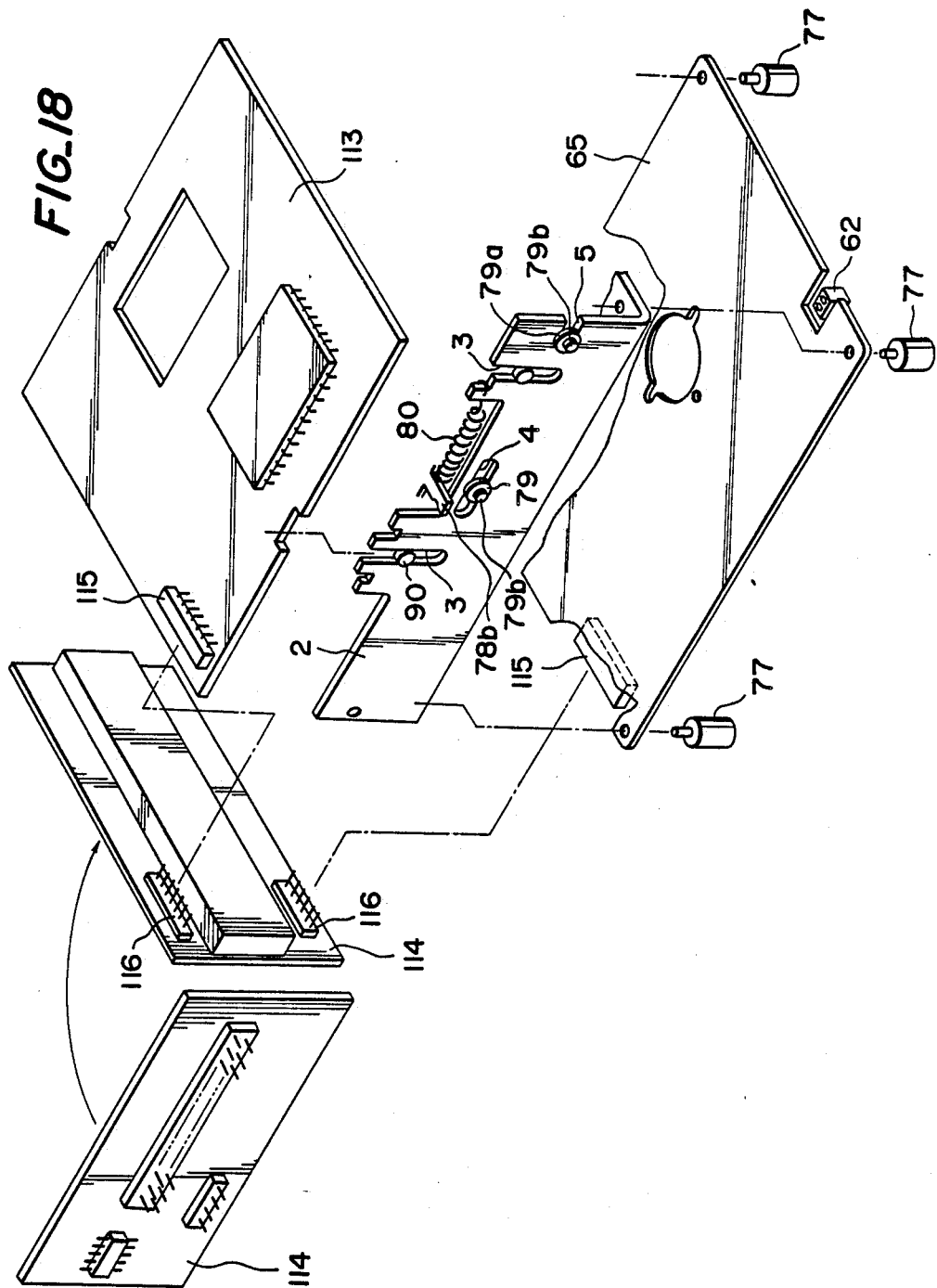
FIG. 18 is an explanatory view used to explain the arrangement of printed circuit boards upon which a control circuit is mounted.
Figure 19:
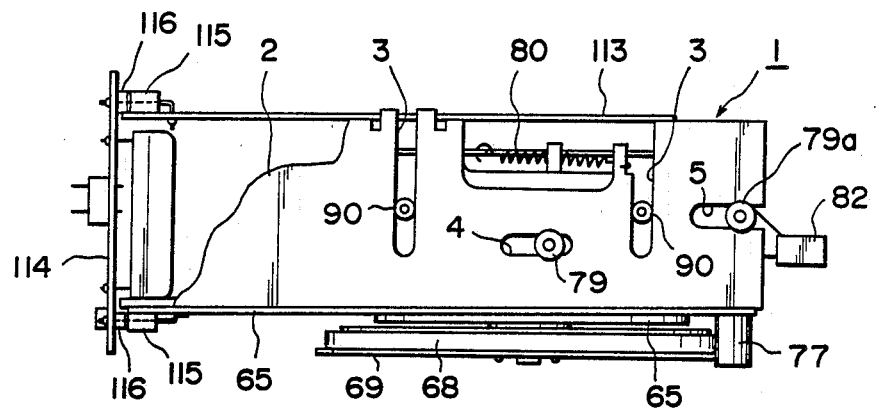
FIG. 19 is a side view showing the chassis upon which the printed circuit boards are mounted.

Electronic parts which constitute the control circuit as shown in FIG. 20A are mounted on the three printed circuit boards 64, 113 and 114 as shown in FIGS. 18 and 19.

The circuits relating to the index detection, the track position detection and the motor drive are mounted on the printed circuit board 65.

The read/write selection switch 104 and the read and write amplifiers 102 and 103 are mounted on the printed circuit board 113, while the circuits associated with interfaces for processing the signals from the printed circuit boards 65 and 113 are mounted on the printed circuit board 114.

The printed circuit boards 65 and 113 are provided with female connectors 115 and 115, while the printed circuit board 114 is provided with male connectors 116 and 116 for connection with the connectors 115 and 115, so that the printed circuit boards 65, 113 and 114 can be electrically interconnected in a simple manner.

As shown in FIG. 19, the printed circuit boards 65, 113 and 114 are mounted on the upper, lower and side surface, respectively, of the chassis 1, so that the adjustments and confirmation of electrical signals can be easily made from the exterior of the chassis 1 in a very simple manner. Thus, if any circuit is broken or fails, it can be repaired in a very simple manner merely by replacing the associated printed circuit board.

The magnetic disc recording and/or reproducing apparatus can be used as a memory for the computer. In this case, various electric and electronic components such as the cathode ray tube, power supply transformer, motor and so on which produce strong magnetic fields are disposed around the magnetic disc recording and/or reproducing apparatus. Therefore, it is necessary that the magnetic disc recording and/or reproducing apparatus is protected from such magnetic fields.

In view of the circumstance, in the present embodiment, the chassis 1 is shaped in the form of U and the upper and side surfaces of the chassis 1 are covered with the iron sliding frame 78, the iron sliding plates 84 and the iron cassette guide 87 so that the magnetic disc recording and/or reproducing apparatus is satisfactorily shielded from external magnetic fields.

FIGS. 21A–21D are schematic views used to explain the tracks of the magnetic disc 64. While in FIG. 21A, only eight tracks are illustrated, the magnetic disc 64 can actually have as many as 40 tracks.

Figure 21A:
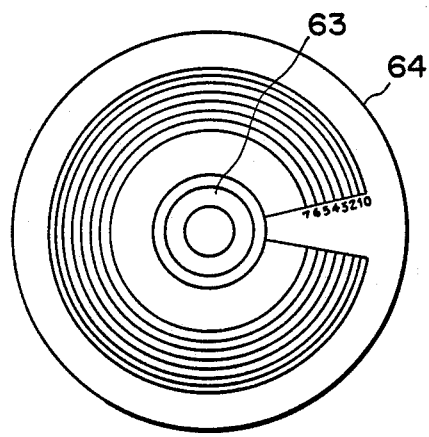
FIG. 21A is a schematic view used to explain recording tracks on a magnetic disc.
Figure 21B:
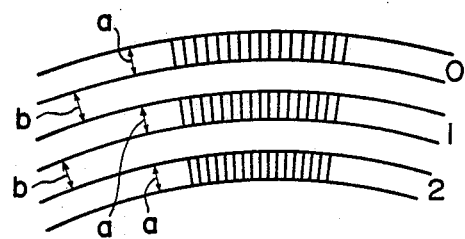
FIG. 21B is a schematic view used to explain recording tracks on which information is coarsely recorded.

FIG. 21B shows, on enlarged scale, three tracks "0", "1" and "2". The track width a is 50 $\mu$m; the track gap b between the adjacent tracks is 70 $\mu$m; and accordingly the track pitch is a +b=120 $\mu$m.

When the track gap b is greater than the track width a like this example, 40 tracks can be increased to 80 tracks so that the recording capacity can be doubled, if the data can be recorded between the tracks.

Figure 21C:
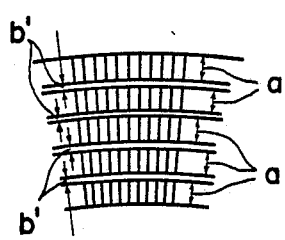
FIG. 21C is a schematic view used to explain recording tracks on which information is densely recorded.

FIG. 21C, shows that the recording capacity is doubled in the manner described above. In FIG. 21C, the track width a≃50 $\mu$m; the track gap b'≃10 $\mu$m; and accordingly the track pitch a+b≃60 $\mu$m.

However, when the track gap b is decreased, it is likely that interference of magnetic recording occurs between the adjacent tracks. In view of this, in the present embodiment, two magnetic heads having different azimuths are used, as shown in FIG. 21D, so that the recording directions are changed alternately.

Figure 21D:
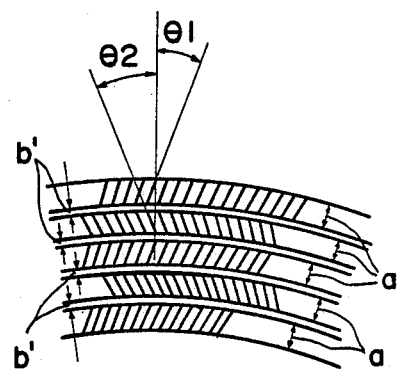
FIG. 21D is a schematic view used to explain recording system employed in the embodiment of the present invention.
Figure 22A:
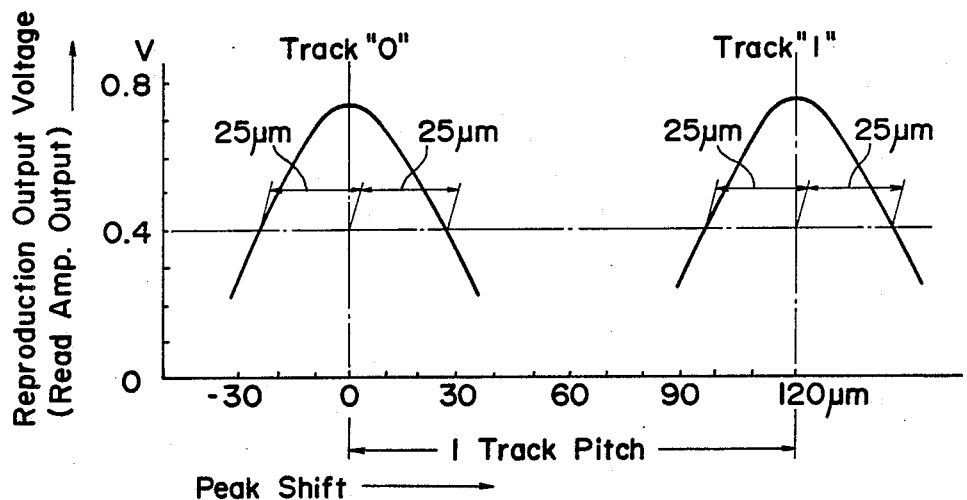

FIG. 22A shows the reproduction output voltage obtained from the magnetic head 47 as it was shifted radially at 10 $\mu$m interval from the outer periphery to the center of the magnetic disc 64 shown in FIG. 21D.

The reproduction output voltage was obtained by measuring the output from the read amplifier 102. The reproduction output voltage is to be applied to the digital processor 101 to produce a peak-to-peak pulse of 5 V voltage of TTL level which is applied to the computer 100.

Therefore, when the input threshold level is set to 0.4 V in the case of applying the output as shown in FIG. 22A to the digital processor 101 and thus it is so arranged that when the input exceeds 0.4 V a pulse is generated, but when the input is less than 0.4 no pulse is generated, a normal digital signal can be obtained, even if the deviation between the centers of the track and the magnetic head 47 becomes $+25 \mu m$, as shown in FIG. 22A.

It follows, therefore, that the total sum of the dimensional tolerances due to vibration or fluctuation of the motor shaft 20, an error in the radius of the cam 26 and expansion or contraction of the magnetic disc 64 due to temperature and humidity variations that may be permitted is as much as $\pm 25 \mu m$.

FIG. 22B illustrates the output when the data is reproduced from the double-density tracks shown in FIG. 21C. In FIG. 22B, curve A illustrates the output characteristic of track "0" when no data is recorded on track "1" and curve B illustrates the output characteristic of track "1" when no data is recorded on track "0".

When information is recorded on tracks "0" and "1" and the measurement is made by displacing the magnetic head 47 from track "0" to track "1", the output is reproduced as indicated by curve C between curves A and B. This means that interference occurs between information on the adjacent tracks.

When the voltage of the hatched area surrounded by curves A, B and C is measured, it is seen that curve C does not correspond to the perfect sum of curves A and B, but curve C includes other noise components. Therefore, curve C does not represent correct information.

In this case, as shown in FIG. 22B, the limit of the deviation between a track and the magnetic head 47 is about one half of 25 $\mu m$ shown in FIG. 22A; that is, $\pm 12 \mu m$. Therefore, the input level to the digital circuit must be set to 0.65 V.

That is, when the recording system as shown in FIG. 21C is employed so as to double the density of recorded information, the dimensional tolerances must be improved by more than a factor of two. For this purpose, parts must be machined with a higher degree of accuracy and accordingly such parts are very expensive.

In view of the above, in the present embodiment, the magnetic recording system as shown in FIG. 21D is employed. That is, recording is made by employing a magnetic head having gaps of different azimuths whose directions are set at $\theta_1 = \theta_2$ in the different directions alternately for the adjacent tracks. In this embodiment, $\theta_1 = \theta_2 = 10°$.

An embodiment of a structure of a magnetic head for carrying out the above-described magnetic recording system is shown in FIGS. 23A and 23B. In FIG. 23A, reference numerals 117 and 118 denote core halves constituting one magnetic head core. When these core halves 117 and 118 are abutted against each other, a gap $G_1$ with an angle of $\theta_1$ is formed. Reference numerals 119 and 120 denote core halves constituting the other magnetic head core. When these core halves 119 and 120 are abutted against each other, a gap $G_2$ with an angle of $\theta_2$ is formed.

These cores are supported by a core support 121 and coils 122 are wound around the core halves 117 and 119.

The core support 121 can be made of a plastic including a large amount of glass material having a coefficient of expansion substantially equal to that of a glass member 123 having a thickness of b' and used to bond the cores or to that of Sendust which may be a material of the core, so that the core support 121 can satisfactory withstand environmental variations such as vibration, temperature variations and the like.

The output characteristic as indicated by curve A in FIG. 22C is obtained when the same information is recorded on tracks "0"-"2" and when the reproduced output voltage is measured by shifting the magnetic head consisting of the core halves 117 and 118 as shown in FIGS. 3A and 23B at an interval of 10 $\mu m$ from the outermost track toward the inner tracks.

Characteristic curve A exhibits a low output voltage at track "1" because information is recorded on track "1" by means of the magnetic head with a gap inclined by $\theta_2$.

That is, the gap used for recording information on track "1" is different from the gap of the head, which is now passing, by 20°, so that the output is low while the noise components are increased.

On the other hand, the output characteristic curve B as indicated by the broken line in FIG. 22C is obtained when the head consisting of the core halves 119 and 120 is shifted from the outermost track to the inner tracks. In this case, the most optimum reproduction output voltage is obtained at track "1".

As described above, magnetic recording and reproduction operations are carried out in such a way that the azimuth head with a gap inclined by $\theta_1$ is used to trace the tracks with even numbers including 0, while the azimuth head with a gap inclined by $\theta_2$ is used to trace the tracks with odd numbers. As a result, interference between magnetically recorded information between the adjacent tracks can be reduced to a minimum.

It follows, therefore, that if the input level is set to 0.4 V, the deviation between the recorded track and the magnetic head is permitted to be as much as 25 $\mu m$.

As described above, when information is recorded at a high density with the magnetic head whose gaps have a gap angle $\theta$ directed in the opposite direction, mechanical dimensional tolerances can be made broader, so that the magnetic recording and/or reproducing apparatus can be made simple in construction and consequently the design of the apparatus may be much facilitated. Furthermore, compatibility of magnetic recording media may be remarkably improved.

Figure 24A:
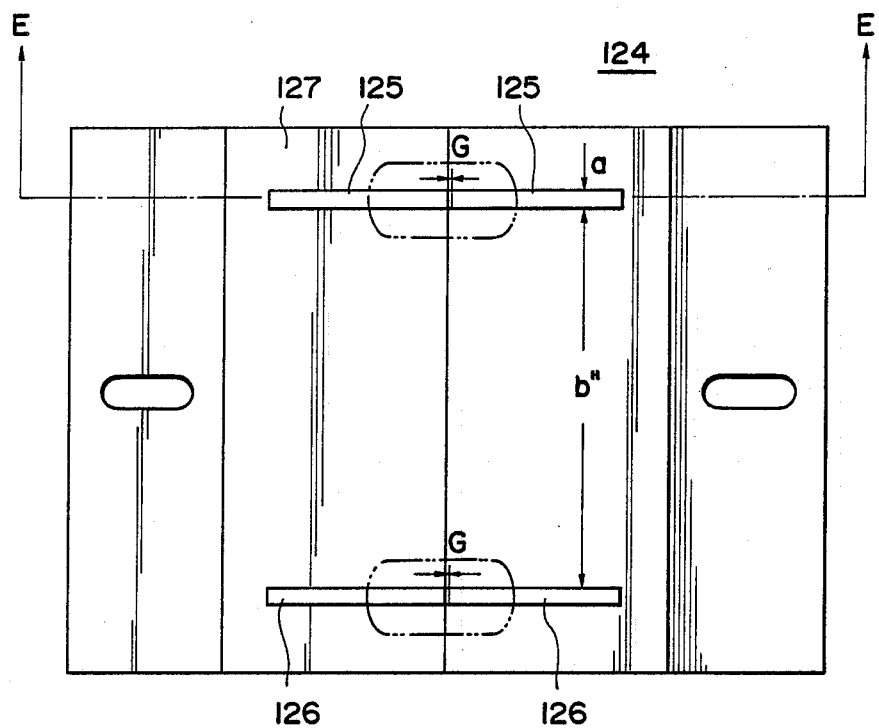
FIG. 24A is a top plan view showing another embodiment of a magnet head.
Figure 24B:
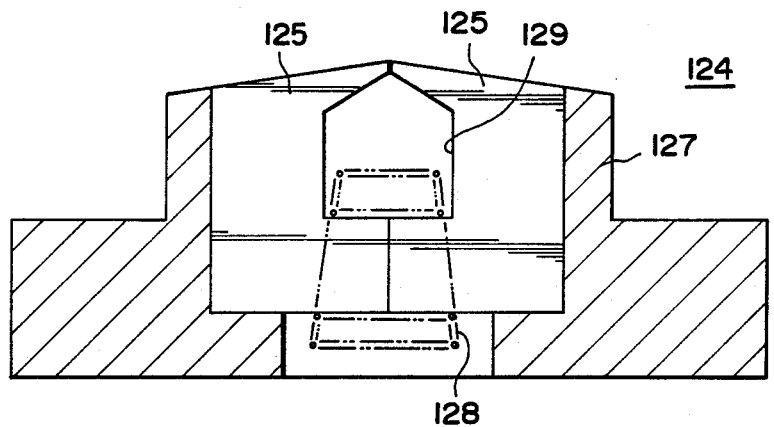
FIG. 24B is a sectional view taken along line E—E in FIG. 24A.

FIGS. 24A and 24B are schematic views used to explain another embodiment of a construction of the magnetic head. In this embodiment, two pairs of magnetic core halves 125 and 126 are mounted on a head mount 127. The core halves 125 and 126 are spaced apart from each other by a predetermined distance b".

The core halves 125 and 126 are 50 $\mu m$ in thickness and the distance b" is 2.5 mm. The core halves 125 and 126 are made of Sendust. A gap $G = 0.1 \mu m$ is made by melted glass. A coil 128 is wound around a winding window 129.

When the magnetic head with the above-described structure is used to carry out the magnetic recording system as illustrated in FIG. 21B, the core halves 125 are used to record and reproduce information on and from tracks "0"-"19", while the core halves 126 are used to record and reproduce information on and from tracks "20"-"39".

Therefore, in order that information is recorded into and reproduced from 40 tracks by means of the magnetic head 124 of the type described above, it is sufficient that the head mount 12 is displaced by 20 steps by means of the pulse motor 8. In this case, it is apparent that it is sufficient that the cam 26 has only 20 cam surfaces.

For instance, if a magnetic head has a single core and the core tracks the tracks "0"–"20", then the tracking time becomes 20×3 ms=60 ms, because the speed characteristic of the pulse motor is 3 ms per track.

Even when the magnetic head is brought to the 20th track, the pulse motor 8 does not immediately stop and is slightly oscillating. Therefore, the recording and reproducing operations must be carried out after the pulse motor 8 has completely stopped. Therefore, the recording and reproducing operations must started after about 70 ms.

If the magnetic head of the type as shown in FIGS. 24A and 24B is used, the recording or reproducing operation on or from track "20" can start immediately after the recording or reproducing operation on or from track "0" without a waiting time.

In the case of a magnetic head with a single core, the time required for accomplishing the recording or reproducing operation of tracks "0"–"39" is 3 ms×39+10 (waiting time)=127 ms. In contrast, if the magnetic head of the type described with reference to FIGS. 23A and 23B or 24A and 24B, the time required is 3 ms×19+10 (waiting time)=67 ms. Therefore there is a time difference of 60 ms between these times, so that the recording or reproducing operation can be carried out at a high speed.

Figure 25:
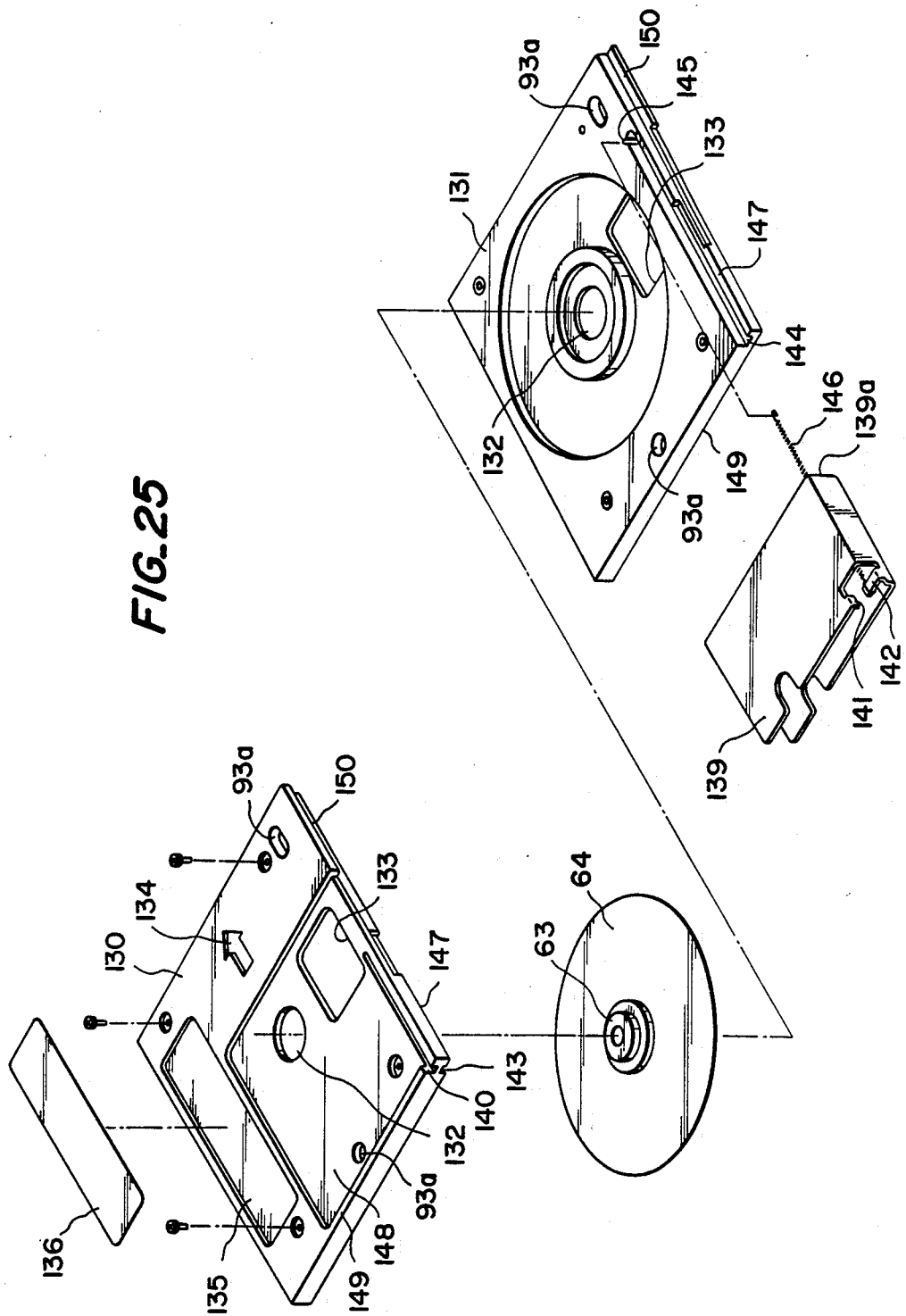
FIG. 25 is an exploded perspective view showing an embodiment of a magnetic disc cassette applicable to an apparatus according to the present invention.

Referring next to FIG. 25, a magnetic disc cassette which can be used in the magnetic disc recording and/or reproducing apparatus in accordance with the present embodiment will be described.

As shown in FIG. 25, the cassette 93 comprises upper and lower cassette halves 130 and 131. A magnetic disc 64 with the center hub 63 is interposed between the upper and lower halves 130 and 131. Each of the cassette halves 130 and 131 has an opening 132 corresponding to the center hub 63 of the magnetic disc 64 and a head and pad window 133.

An arrow 134 indicates the direction of cassette insertion. A label 136 in which the name of a recorded program is filled may be bonded to the bottom of a recess 135.

The projections 7a and 7a extended upwardly from the upper ends of the pins 7 and 7 are fitted into positioning holes 93a and 93a.

A shutter 139 which is U-shaped in cross section is fitted to the outside of the cassette halves 130 and 131. That is, the shutter 139 is slidably fitted over the cassette 93.

The shutter 139 has a projection 141 on one side thereof which is slidably engaged with a groove 140 formed on the upper surface of the upper cassette half 130. The shutter 139 also has a projection 142 which is bent inwardly in opposite to the projection 141. The projection 142 is slidably engaged with grooves 143 and 144 formed on the inner surfaces of the upper and lower cassette halves 130 and 131, thereby guiding the shutter 139.

A pin 145 is extended upwardly at the innermost end of the groove 144 of the lower cassette half 131. A spring 146 is provided between the projection 142 of the shutter 139 and the pin 145, so that the shutter 139 is normally biased toward the center of the cassette 93.

Along the side edges of the grooves 143 and 144 of the cassette halves 130 and 131 stepped portions 147 and 147, respectively, are formed so as to guide the projections 142 along the side edge of the grooves 143 and 144.

The outer surfaces of the cassette halves 130 and 131 have rectangular recesses 148 and 148, for receiving the shutter 139, respectively.

The upper and lower cassette halves 130 and 131 have stepped portion 149 and 149 functioning as a stopper, respectively, for preventing the shutter 139 from being pulled out of the cassette 93.

Figure 28:
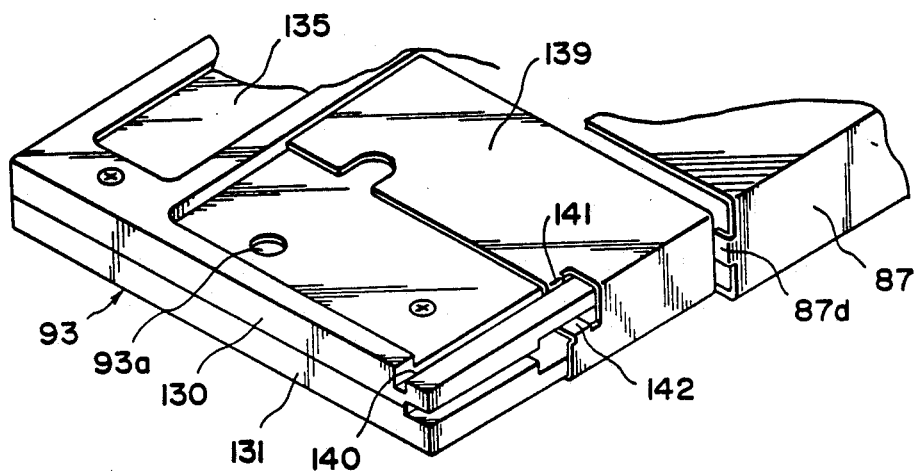
FIG. 28 is a perspective view used to explain the opening operation of the shutter.

The upper and lower cassette halves 130 and 131 have grooves 150 and 150, respectively, for allowing the projection 87d protruded from the inlet end of the cassette guide 87 (see FIG. 9) to pass therethrough so that the projection 87d opens the shutter 139 upon the insertion of the cassette 93 into the cassette guide 87, as shown in FIG. 28.

Figure 27:
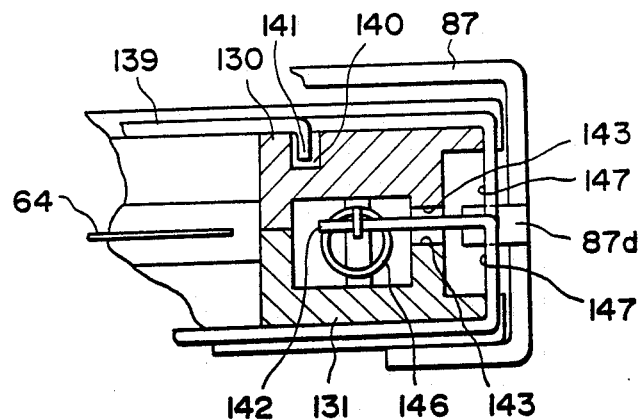
FIG. 27 is a sectional view, on enlarged scale, taken along line F—F in FIG. 26A.

As shown in FIGS. 27 and 28, when the cassette 93 is inserted, the projection 87d engages with the side edge 139a of the shutter 139, so that the shutter 139 which has closed the head window 133 is opened.

Figure 26A:
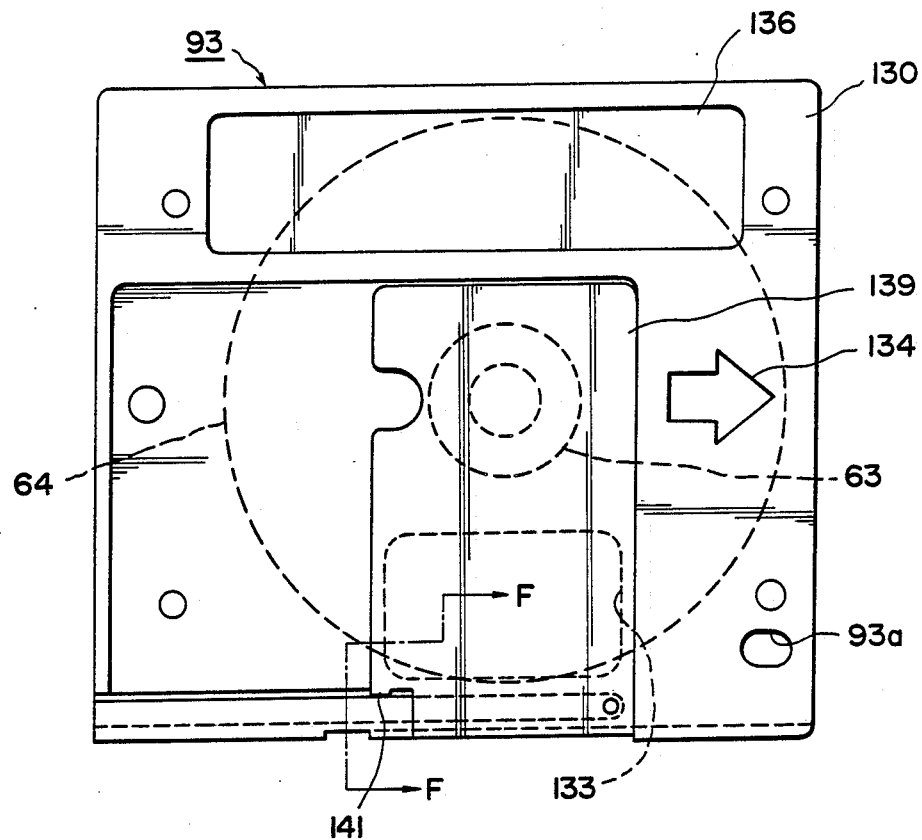
FIGS. 26A and 26B are a top plan view and a side view showing the cassette when the shutter is closed, respectively.
Figure 26B:
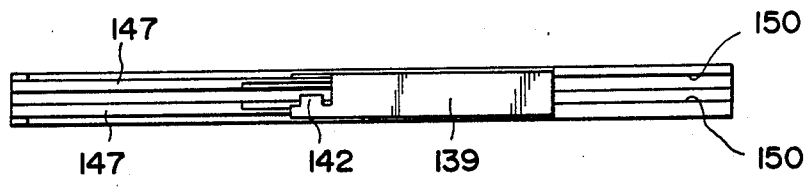
Figure 26C:
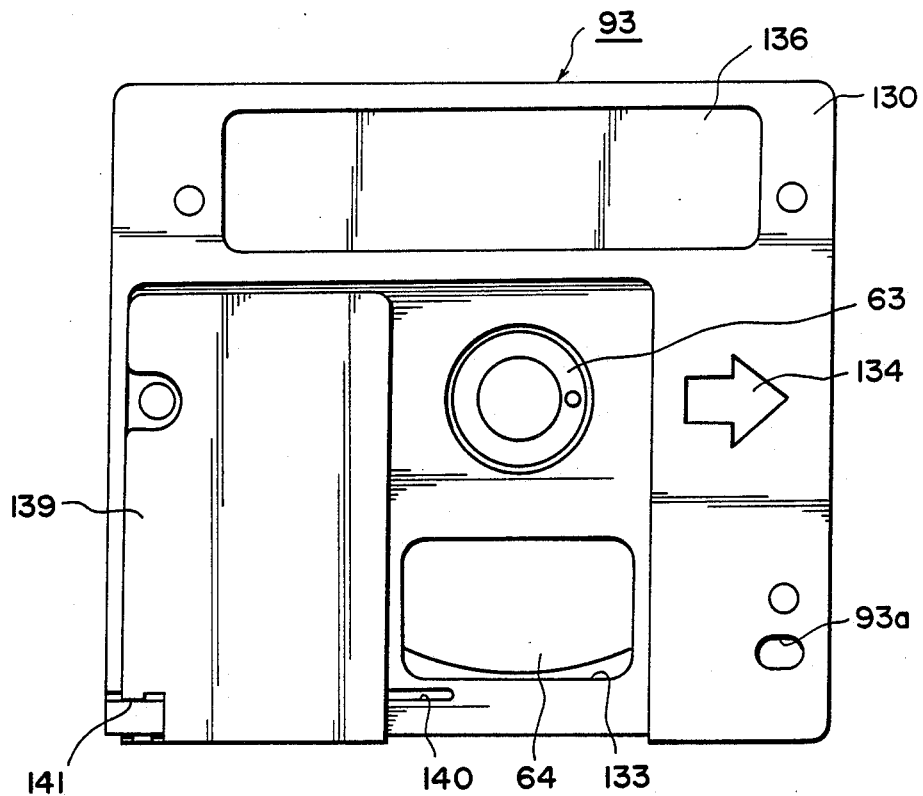
FIGS. 26C and 26D are a top plan view and a side view of the cassette when the shutter is opened, respectively.
Figure 26D:
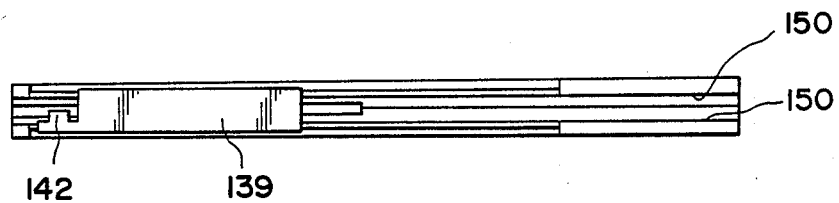

FIGS. 26A and 26B show the case that the shutter 139 is closed, while FIGS. 26C and 26D show the case that the shutter 139 is opened.

The magnetic disc cassette which is to be used in the magnetic disc recording and/or reproducing apparatus in accordance with the present embodiment is designed and constructed as described above, so that the shutter which is normally closed is automatically opened by merely inserting the cassette 93 into the cassette guide 87 on the side of the magnetic disc recording and/or reproducing apparatus. Therefore, the start of the recording or reproducing operation is ensured.

As described above, according to the present embodiment of a magnetic disc recording and/or reproducing apparatus in which a magnetic disc cassette containing a magnetic disc provided with a center hub is loaded so that the center hub engages with a rotary shaft of a disc rotating motor to rotate the magnetic disc, a cam as a rotation reference for displacing a magnetic head is fitted to the outer periphery of a boss supporting a bearing which in turn supports rotatably the rotary shaft, so that the force from the cam can be transmitted to the magnetic head through a bearing utilizing the rotational movement having a high transmission efficiency. As a result, a pulse motor for displacing the magnetic head can be made compact in size and light in weight and the power consumption of the pulse motor can be reduced.

Furthermore, the cam is interposed between the level of the magnetic head and the chassis and the rotary shaft of the disc rotating motor is used also as the rotation center for the cam via a bearing mechanism, so that the magnetic head can access any position. As a result, the positioning mechanism can be disposed in a small space, so that the magnetic disc recording and/or reproducing apparatus can be made compact in size and light in weight.

As described above, a head mount for mounting the magnetic head is supported by bearings with an extremely small rolling friction. As a result, the magnetic head can be displaced with a low load, so that not only the cam but also the pulse motor can be made compact in size and light in weight. As a consequence, the magnetic disc recording and/or reproducing apparatus in accordance with the present embodiment may be provided at a relatively low cost.

The position of the magnetic head can be adjusted not only in the axial direction of the drive shaft of the disc rotating motor but also in the plane perpendicular to the axial direction of the drive shaft. In addition, the member for pressing the magnetic disc to the magnetic head can be adjusted in the axial direction of the disc rotating motor. Therefore, the deviation between the head mount and the head chip as well as the extremely small dimensional error due to play in the bearings of the head mount can be correctly adjusted in a simple manner. As a result, the reliability of the magnetic disc recording and/or reproducing apparatus of the present embodiment can be remarkably improved.

Moreover, the coefficient of linear expansion of the material of a magnetic disc is substantially equal or similar to that of the material of the cam for displacing the magnetic head, so that there is an advantage in that a deviation does not occur between the magnetic head and a track due to temperature variation.

Furthermore, a projection is formed integrally with the cam for displacing the magnetic head and there is provided a lever which is actuated by this cam. In response to the movement of the lever, a "0" track sensor is energized, so that the movement of one end of the lever can be increased by scores of times by utilizing the lever ratio. As a result, even though the structure is very simple, the outermost track can be detected with an extremely high accuracy.

What is claimed is:

1. A disc recording and/or reproducing apparatus comprising:
    a recording and/or reproducing head for recording and/or reproducing information on and/or from a disc-shaped recording medium;
    a rotary shaft for rotating said disc-shaped recording medium;
    a hollow member which surrounds said rotary shaft without preventing the rotation thereof;
    a head positioning member having a cam which is rotatable around the outer periphery of said hollow member and whose position relative to the center of rotation varies, said cam positioning said recording and/or reproducing head on said disc-shaped recording medium;
    a head mount having an engaging portion for engaging with said cam surface and a mounting portion on which said recording and/or reproducing head is mounted, said head mount displacing said reading and/or reproducing head with respect to said disc-shaped recording medium in response to the rotation of said cam;
    a head adjusting member disposed on said head mount for adjusting the position of said recording and/or reproducing head on said head mount;
    a biasing member for forcing said head mount against said hollow member so that the outer periphery of said hollow member is brought into contact with the inner periphery of said head positioning member at a position in the direction in which said head mount is forced to move; and
    driving means for driving said rotary shaft to rotate said disc-shaped recording medium and for driving said cam to position said recording and/or reproducing head on said disc-shaped recording medium, said rotary shaft and said cam being rotated at different rotational speeds.

2. A disc recording and/or reproducing apparatus as claimed in claim 1, wherein said hollow member is a boss having bearings for rotatably supporting said rotary shaft, said boss being securely fixed to a chassis.

3. A disc recording and/or reproducing apparatus as claimed in claim 2, wherein the inner periphery of said head positioning member has an inner diameter larger than the outer diameter of the outer periphery of said hollow member; the rotation of said head positioning member is transmitted from a drive means via a gear member; and the center of said rotation is not fixed by the force of said biasing member.

4. A disc recording and/or reproducing apparatus as claimed in claim 3, wherein the cam in said head positioning member is provided with a plurality of cam surfaces which are formed discontinuously, so that the position of said recording and/or reproducing head is varied stepwise in response to said rotation.

5. A disc recording and/or reproducing apparatus as claimed in claim 2, further comprising:
    a first guide member extending in the radial direction of said disc-shaped recording medium; and
    a bearing member disposed on said head mount for reducing the sliding friction produced when said head mount is displaced along said first guide member.

6. A disc recording and/or reproducing apparatus as claimed in claim 5, wherein said head mount is provided with a second guide member disposed in parallel with said first guide member and a roller member for making rolling contact with said second guide member.

7. A disc recording and/or reproducing apparatus as claimed in claim 6, wherein said bearing member comprises a roller bearing.

8. A disc recording and/or reproducing apparatus as claimed in claim 6, wherein said bearing member comprises a sliding bearing made of a wear resistance material.

9. A disc recording and/or reproducing apparatus as claimed in claim 8, wherein said wear resistance material is ruby.

10. A disc recording and/or reproducing apparatus as claimed in claim 1, wherein said first driving means is a brushless motor having a coil disposed on a printed circuit board and a ring-shaped magnet secured on said rotary shaft and disposed in the vicinity of said coil.

11. A disc recording and/or reproducing apparatus as claimed in claim 1, wherein said head adjusting member is capable of adjusting the position of said recording and/or reproducing head in the radial direction of said disc-shaped recording medium, and an azimuth of a gap of said recording and/or reproducing head with respect to a recording track in said disc-shaped recording medium.

12. A disc recording and/or reproducing apparatus comprising:
    a recording and/or reproducing head for recording and/or reproducing information on and/or from a disc-shaped recording medium;
    a rotary shaft for rotating said disc-shaped recording medium;
    a cam member rotatable around said rotary shaft without preventing the rotation of said rotary shaft, said cam member having radii which are centered on said rotary shaft and varied to form a spiral surface of said cam member;
    a head carriage having an engaging portion for engaging with said cam surface and on which said recording and/or reproducing head is mounted, said head carriage displacing said recording and/or reproducing head with respect to said disc-shaped recording medium in response to the rotation of said cam; and a head adjusting member disposed on said head carriage for adjusting the position of said recording and/or reproducing head on said head carriage, said head adjusting member being capable of adjusting the position of said recording and/or reproducing head in the radial direction of said disc-shaped recording medium, and a gradient of said recording and/or reproducing head in the direction of a tangent to said disc-shaped recording medium.

13. A disc recording and/or reproducing apparatus as claimed in claim 1, further comprising driving means for driving said rotary shaft and said cam member to rotate at different drive speeds.

14. A disc recording and/or reproducing apparatus as claimed in claim 1, wherein the cam in said head positioning member is provided with a plurality of cam surfaces which are formed discontinuously, so that the position of said recording and/or reproducing head is varied stepwise in response to said rotation.

15. A disc recording and/or reproducing apparatus as claimed in claim 1, further comprising:

a first guide member extending in the radial direction of said disc-shaped recording medium; and a bearing member disposed on said head mount for reducing the sliding friction produced when said head mount is displaced along said first guide member.

16. A disc recording and/or reproducing apparatus as claimed in claim 15, wherein said head mount is provided with a second guide member disposed in parallel with said first guide member and a roller member for making rolling contact with said second guide member.

17. A disc recording and/or reproducing apparatus as claimed in claim 16, wherein said bearing member comprises a roller bearing.

18. A disc recording and/or reproducing apparatus as claimed in claim 12, wherein said first driving means is a brushless motor having a coil disposed on a printed circuit board and a ring-shaped magnet secured on said rotary shaft and disposed in the vicinity of said coil.

* * * * *